United States Patent
Tang

(10) Patent No.: US 12,039,549 B2
(45) Date of Patent: Jul. 16, 2024

(54) SYSTEM AND METHOD FOR STORE OPERATIONAL ANALYTICS

(71) Applicant: Hughes Network Systems, LLC, Germantown, MD (US)

(72) Inventor: Tim Tang, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 11 days.

(21) Appl. No.: 17/079,909

(22) Filed: Oct. 26, 2020

(65) Prior Publication Data

US 2022/0129918 A1   Apr. 28, 2022

(51) Int. Cl.
| | |
|---|---|
| *G06Q 30/0201* | (2023.01) |
| *G06Q 10/0631* | (2023.01) |
| *G06Q 10/087* | (2023.01) |
| *G06Q 30/018* | (2023.01) |
| *G07C 1/10* | (2006.01) |
| *H04W 4/029* | (2018.01) |
| *H04W 88/08* | (2009.01) |

(52) U.S. Cl.
CPC ... *G06Q 30/0201* (2013.01); *G06Q 10/06311* (2013.01); *G06Q 10/087* (2013.01); *G06Q 30/0185* (2013.01); *G07C 1/10* (2013.01); *H04W 4/029* (2018.02); *H04W 88/08* (2013.01)

(58) Field of Classification Search
None
See application file for complete search history.

(56) References Cited

U.S. PATENT DOCUMENTS

| | | | |
|---|---|---|---|
| 10,217,120 B1* | 2/2019 | Shin | G01S 5/0263 |
| 10,657,561 B1* | 5/2020 | Aravind | G06Q 30/0261 |
| 2014/0165614 A1* | 6/2014 | Manning | F25D 29/00 62/62 |
| 2014/0278655 A1* | 9/2014 | Sorensen | G06Q 30/0201 705/7.17 |
| 2016/0371755 A1* | 12/2016 | High | H04W 4/021 |
| 2017/0116589 A1* | 4/2017 | Krishnaiah | G06Q 20/322 |
| 2017/0213233 A1* | 7/2017 | High | G06Q 20/387 |
| 2018/0306958 A1* | 10/2018 | Goss | A47F 10/02 |
| 2018/0350218 A1* | 12/2018 | Jeon | G06K 7/10475 |

(Continued)

FOREIGN PATENT DOCUMENTS

WO  WO-2007086808 A2 *  8/2007  ......... G06Q 10/087

OTHER PUBLICATIONS

Lee and Özer. "Unlocking the Value of RFID." Production and Operations Management 16(1), pp. 40-64, Jan.-Feb. 2007. (Year: 2007).*

*Primary Examiner* — Susanna M. Diaz
(74) *Attorney, Agent, or Firm* — GLOBAL IP COUNSELORS, LLP

(57) ABSTRACT

An operational analytics system includes a plurality of access point devices and an electronic controller. The plurality of access point devices are configured to receive a wireless signal for at least one wireless device. The electronic controller is configured to receive a signal strength indicator for the at least one wireless device from the plurality of access point devices, calculate a position of the at least one wireless device based on the signal strength indicator for the at least one wireless device, and configured to determine a time the wireless device remains at the position, and when the time exceeds a threshold time, perform a mitigation operation.

19 Claims, 12 Drawing Sheets

(56) References Cited

U.S. PATENT DOCUMENTS

| | | | | |
|---|---|---|---|---|
| 2019/0138975 A1* | 5/2019 | Zuberi | ................ | G06Q 10/087 |
| 2020/0118400 A1* | 4/2020 | Zalewski | ............. | G06Q 20/327 |
| 2021/0090054 A1* | 3/2021 | Motoki | ................ | G06Q 20/208 |
| 2021/0287013 A1* | 9/2021 | Carter | ..................... | G06F 18/21 |

\* cited by examiner

SYSTEM AND METHOD FOR STORE OPERATIONAL ANALYTICS

BACKGROUND

Field of the Invention

The present invention generally relates to a system and method for operational analytics. More specifically, the present invention relates to a system and method for operational analytics that can enable retailers to respond to real-time localized changes.

Background Information

Retail analytics can provide analysis of business trends, patterns, and performance in the retail industry. Retail business analytics allow the retail store to leverage data-driven insights to improve customer experience, increase sales, and optimize operations.

SUMMARY

It has been discovered that improved operational analytics are desired. Brand operators are often confused or unsure as to why two similar stores (e.g. size, inventory, staffing levels) with similar customer demographics and traffic patterns can routinely produce such dramatically different sales results. Store managers require improved insight into customer and employee behavior in the stores.

Current methodologies are either too expensive or unactionable. Furthermore, many retailers do not have the internal expertise or the cycles to analyze the enormous volumes of store data from all of their stores. The present disclosure describes a system and method that provides real-time, actionable insights for store operators at a mass-market affordable price point.

Furthermore, in some embodiments, Wi-Fi presence analytics data (e.g. demographics, traffic count, dwell time, repeat visits) can be correlated with other data sources (e.g. store traffic, customer satisfaction, sales revenue, inventory turnover, conversion, etc.) to establish system level baselines. As can be understood, a store that continually deviates from updated system-wide, operational baselines beyond the acceptable thresholds will be flagged for proactive intervention.

Furthermore, embodiments of the present invention can profile specific deviations for real-time alerting. (e.g. fraudulent credit cards).

In view of the state of the known technology, one aspect of the present disclosure is to provide an operational analytics system that includes a plurality of access point devices and an electronic controller. The plurality of access point devices are configured to receive a wireless signal for at least one wireless device. The electronic controller is configured to receive a signal strength indicator for the at least one wireless device from the plurality of access point devices, calculate a position of the at least one wireless device based on the signal strength indicator for the at least one wireless device, and configured to determine a time the wireless device remains within a predetermined distance of the position, and when the time exceeds a threshold time, perform a mitigation operation.

Another aspect of the present disclosure is to provide an operational analytics system that includes a plurality of access point devices and an electronic controller. The plurality of access point devices are configured to receive a wireless signal for wireless devices and a wireless signal from a product in inventory. The electronic controller is configured to receive signal strength indicators for the plurality of access point devices, and track a position of the wireless devices based on the signal strength indicator for each of the wireless devices, configured to receive a signal strength indicator for the product from the plurality of access point devices, track the position of the product based on the signal strength indicator for the product, and calculate a distance between the tracked position of the wireless devices and the tracked position of the product, and when the distance between the of tracked position of a wireless device of the wireless devices and the tracked position of the product is below a threshold distance and at a predetermined location, reduce a number of the product in inventory.

Another aspect of the present disclosure is to provide a method comprising receiving a wireless signal for a wireless device with an access point device, receiving, with an electronic controller, a signal strength indicator for the wireless device from the access point device, calculating a position of the wireless device based on the signal strength indicator for the wireless device, determining the position is a predetermined position, and when the at least one wireless device is at the predetermined position and meets a predetermined parameter, performing a mitigation operation.

These systems and methods provide real-time, actionable insights for store operators at a mass-market affordable price point.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
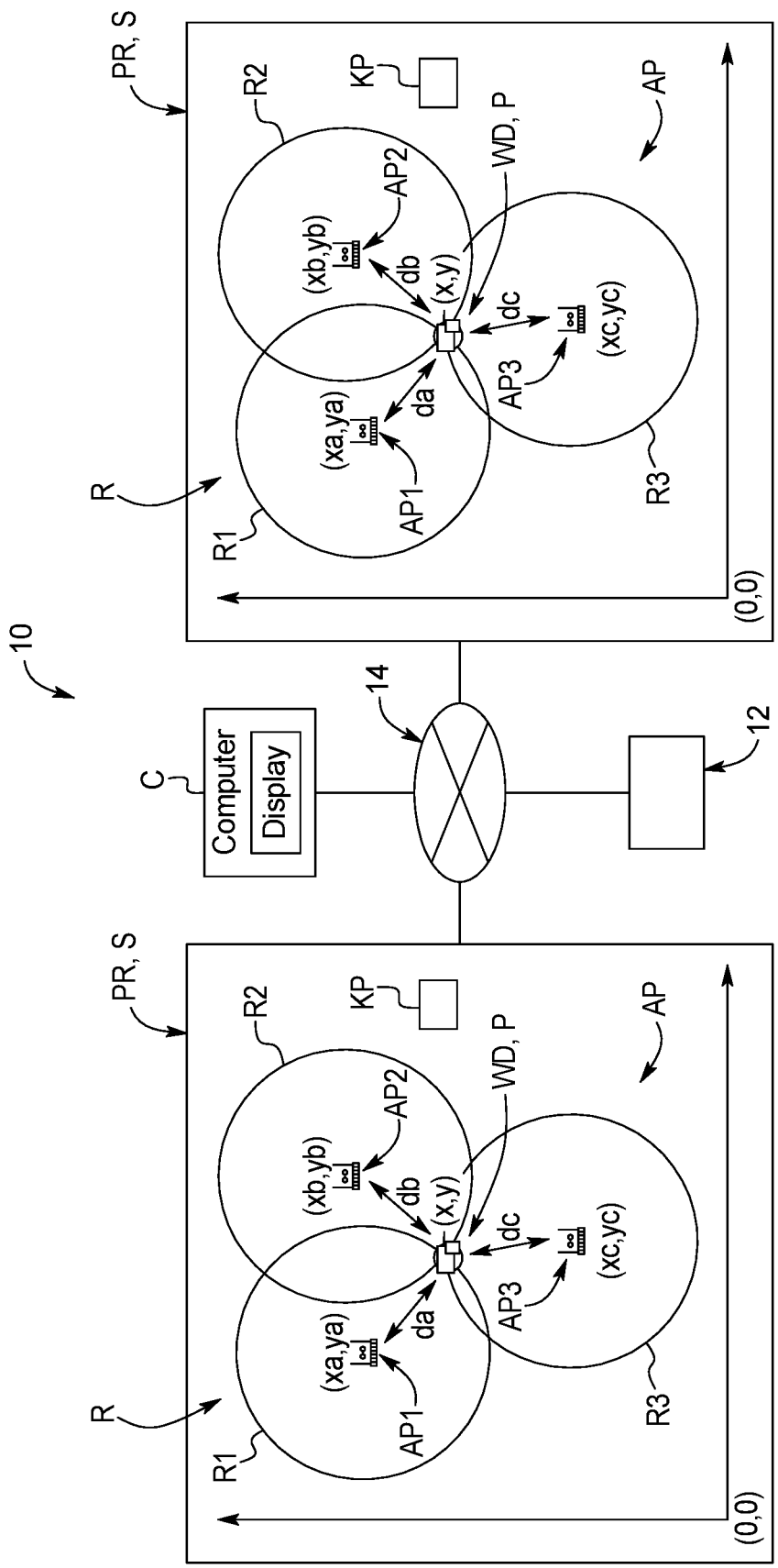
FIG. 1 is a schematic diagram of an operational analytics system in accordance with one embodiment of the present disclosure.

Referring initially to FIG. 1, an operational analytics system 10 is illustrated that is equipped with a server 12 in accordance with one embodiment. As illustrated in FIG. 1, the operational analytics system 10 also includes a plurality of access points AP (e.g., a plurality of access point devices). In the embodiment, as illustrated in FIG. 1, three access points AP1, AP2 and AP3 are installed at positions (xa, ya), (xb, yb) and (xc, yc), respectively, on the Premises PR of a property. Here, as can be seen, there are two premises PR connected to the server 12. Each premises PR is shown in a similar manner, but it can be understood, the premises PR can have any suitable configuration or design with any number of access points AP. Moreover, the server 12 can be connected to any number of premises PR. In one example, the access points AP1, AP2 and AP3 can be in an indoor space S of the store buildings. However, as discussed below, the access points AP1, AP2 and AP3 can be installed externally to the store or in any suitable position.

The access points AP1, AP2 and AP3 are networking hardware devices that allow at least one wireless devices WD (and generally a plurality of wireless devices) to connect to a wired network. In the illustrated embodiment, only one wireless device WD is illustrated for the sake of brevity. The wireless device WD can be any type of wireless devices, such as mobile phones, tablets, smart watches, personal computers and the like. In the illustrated embodiment, the access points AP1, AP2 and AP3 provide wireless connections using wireless LAN technology, such as Wi-Fi, for the wireless devices WD. Specifically, in the illustrated embodiment, the access points AP1, AP2 and AP3 provides 5 GHz/2.4 GHz dual band wireless LAN, for example. The access points AP1, AP2 and AP3 connect to a network 14, such as the Internet, via a router (not shown), for example. Of course, alternatively, the access points AP1, AP2 and AP3 each can be integrally formed with a router to connect the network 14. Moreover, as illustrated in FIG. 1, a computer C or a plurality of computers can be connected to the network 14. The computer C can be on the same Premises PR as the wireless device WD or it can be remote. Moreover, the computer C can be connected to the network wirelessly or using sires or in any suitable manner.

Figure 2:
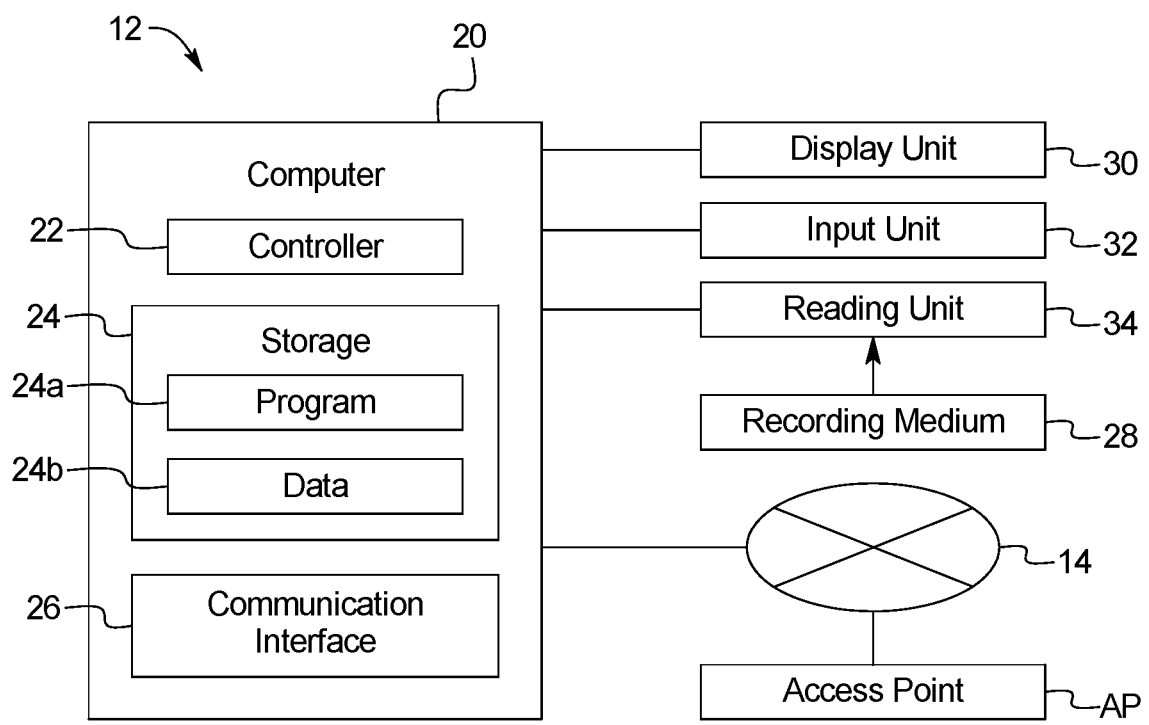
FIG. 2 is a block diagram of an operational analytics device of the operational analytics system shown in FIG. 1.

In the illustrated embodiment, as illustrated in FIG. 1, the server 12 is connected to the access points AP1, AP2 and AP3 via the network 14. As can be understood, the server 12 can be on the premises PR in the cloud or any remote location. Moreover, as illustrated the server 12 can be in communication with multiple stores to be able to track information and data across the multiple stores and location. As illustrated in FIG. 2, the server 12 includes a computer 20 having an electronic controller 22 (e.g., a processor), a computer data storage 24 and a communication interface or module 26. The terms "controller" and "electronic controller" as used herein refer to hardware that executes a software program and does not include a human. In the illustrated embodiment, the controller 22 includes a processor, such as a CPU. The controller 22 can also include other conventional components such as an input interface circuit, an output interface circuit, and a computer memory such as a ROM (Read Only Memory) and a RAM (Random Access Memory). The processor of the controller 22 is programmed to execute an algorithm (e.g., a method) of the present disclosure as discussed below. The memory stores processing results and programs for executing the algorithm that is run by the processor. Of course, the controller 22 is capable of selectively controlling any of the components of the computer 20 in accordance with a control program. The data storage 24 is a secondary storage, such as a hard disk drive, a solid-state drives and the like, that stores a program 24a for executing the algorithm, data 24b that is received from the access points AP1, AP2 and AP3 for executing the algorithm and is outputted by executing the algorithm, and other stored information, such as map layouts of the Premises PR of the store and specific locations of predetermined store components (known positions KP). The communication interface 26 is an electronic circuit that enables the computer 20 to communicate with the access points AP1, AP2 and AP3 via the network 14.

In the illustrated embodiment, the computer 20 can execute the algorithm by causing the controller 22 to execute the program 24a that is read from the data storage 24. Alternatively, or additionally, the program for the algorithm can be read from a recording medium 28. The recording medium 28 is an example of a non-transitory computer-readable recording medium, such as an optical disk, a magnetic disk, a nonvolatile semiconductor memory, and can store the program for the algorithm therein. Furthermore, as illustrated in FIG. 2, the server 12 also includes a display unit 30 (display) such as a liquid crystal display device, an input unit 32 (input) having an input device such as a keyboard and a mouse, and a reading unit 34 (reader) for reading the program and various data from the recording medium 28. The reading unit 34 is a reader device or the like corresponding to the type of the recording medium 28.

Figure 3:
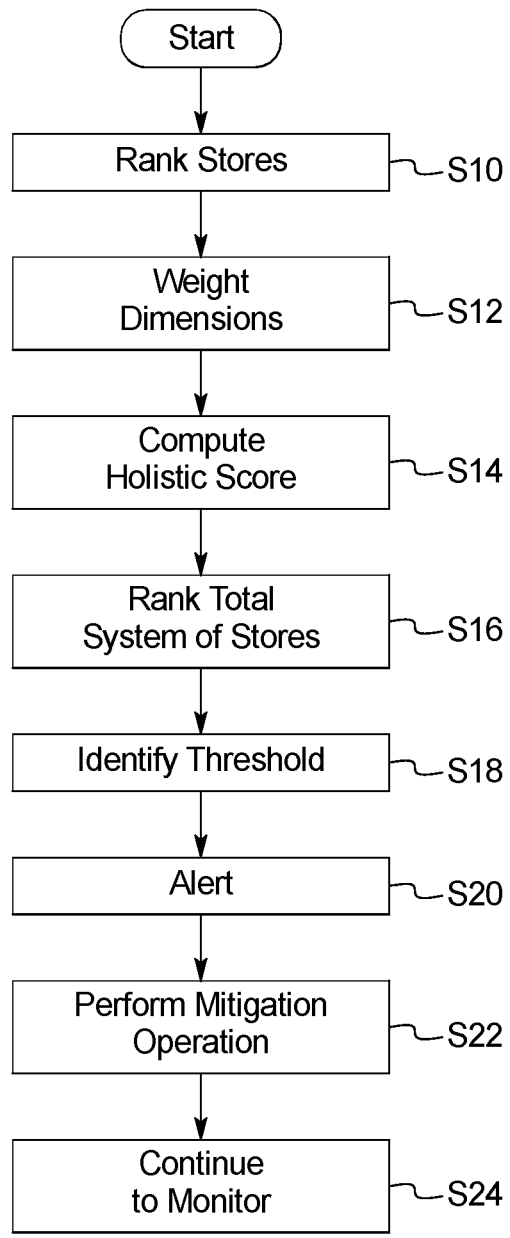
FIG. 3 is a flowchart of the code of an algorithm of the store performance correlation analytics shown in FIG. 1.

Referring to FIG. 3, an algorithm executed by the server 12 of a Continuous Store Performance Analysis Methodology will be explained. In step S10 the controller ranks stores by various demographic dimensions (e.g. customer, race, personal wealth, urban/suburban, etc.) and retail performance dimensions (e.g. weekly sales, customer satisfaction, employee satisfaction, profitability.) In this step the controller can be preprogrammed with this information from data collected and entered into the storage or the data can be collected by the server through monitoring store operations and usage, or a combination thereof. The controller can continually update this information, or the information can be updated by a user in an add needed or desired basis. Next in step S12, the controller weights each dimension by a weighting value correlating to business value. In step S14, the controller computes a holistic score for each store. The controller can compute the holistic score using the following formula:

Store Score=Dimension #1*Weighting #1+Dimension #2*Weighting #2+Dimension #n*Weighting #n.

In step S16, the controller ranks total system of stores, and in Step S18 identifies a cut off threshold for minimally acceptable performance (e.g., a predetermined parameter). In step S20, the controller can cause an alert for a store or a plurality of store that fail to meet minimal acceptable performance based on the holistic score or a subset of individual Dimensions. Alternatively, the controller can cause an alert on individual consumer behavior that excessively deviates from normal thresholds in step S20. In step S22 the controller can apply appropriate interventions or mitigation operations to improve store performance based on identified weaknesses, or alternatively, the controller can cause an alert to be issued to store personal for a need or potential need for intervention (e.g. fraudulent behavior, unhappy customer, etc.) in step S22. In steps S24, the controller can continuously measure and compute store ranking (cycle back to step S10).

Figure 4:
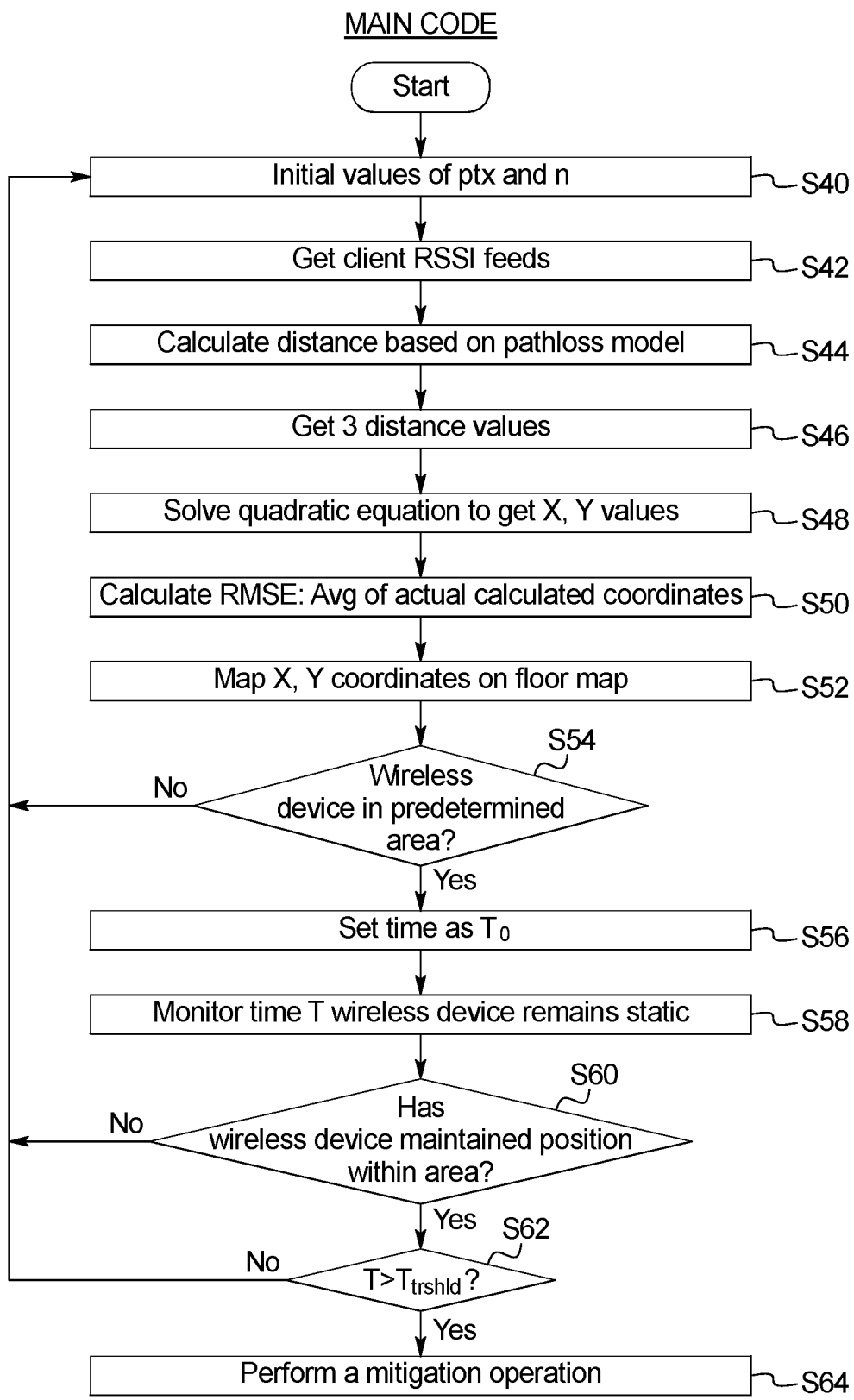
FIG. 4 is a flowchart of a code of an algorithm of the operational analytics system shown in FIG. 1.

Referring now to FIG. 4, the algorithm executed by the server 12 will be explained. FIG. 4 is a flowchart of a main code of the algorithm of the system 12. In the illustrated embodiment, the algorithm of the present disclosure determines the positions (x, y) (e.g., locations) of the wireless devices WD on the Premises PR of a property (see FIG. 1). Specifically, in the illustrated embodiment, the main code of the algorithm provides the positions (i.e., location coordinates (x, y)) of the wireless devices WD based on received signal strength indicator (RSSI) values at the access points AP1, AP2 and AP3. The RSSI value indicates an estimated measure of power level that a wireless device is receiving from an access point. In the illustrated embodiment, the main code includes general trilateration or triangulation code. However, the algorithm does not assume any specific access point configurations and/or placements or floor map details, and thus can be used with any types of access points providing RSSI values of the wireless devices WD.

Furthermore, in the illustrated embodiment, the optimizing code of the algorithm works on optimizing the trilateration or triangulation of the main code, and optimizes the calculated positions by making certain assumptions on certain fixed wireless devices WD. Specifically, the main function of the optimizing code is to take in sample location feeds and to provide optimized radio transmission parameters, such as transmission power of the access points AP and transmission pathloss coefficients, which provide the optimized localization results. Thus, the algorithm of the present disclosure can optimize Wi-Fi indoor triangulation for wireless device positions. In the illustrated embodiment, these main and optimizing code can be used for 2.4 and 5 GHz access points AP.

In general, the following two types of calculation methods utilizing only RSSI values to determine client locations are used in the field of client location mappings:

1) RSSI Trilateration: This is the most straight forward method, in which the distance from each access point AP is estimated based on the received RSSI by using a pathloss model. Three such consecutive distances are then used to solve geometrically to determine (X, Y) coordinates of the client location. This method just requires the access point locations to calculate the client locations. However, this method generally requires exactly three access points, and if desired can work with more than three access points. Also, the credibility of this method depends on the pathloss model used and can vary based on the installation environment of each store.

2) Maximum likelihood estimation: This method takes into the account the access point placement and density. It requires beforehand information on the exact floor map, the access point placement density and locations. It also requires the access points to be placed in a particular pattern, which is not always possible. The benefit of this method comes from the fact that it scales well with the number of access points deployed and with larger areas. In fact, the greater number of access points deployed, the better the accuracy is. The basis of this method is to not calculate the client location, but to make an estimation of the client location based on the RSSI value. Hence for a large retail space, with different stores or zones, an estimation on the RSSI values is made for each store/zone. Hence the client location is given based on the probability of it lying in a particular zone. This works well for different setups, as a calibration is done for each zone, but come at the price of granularity. Hence for smaller setups, the estimation may not be precise enough and the error can increase, resulting in the granularity for each store/zone to be reduced.

In the illustrated embodiment, since the maximum likelihood estimation may be insufficient for some types of Applicant's deployment, the algorithm of the present disclosure generally includes the RSSI trilateration; although the invention is not limited to the use of this estimation.

As illustrated in FIG. 1, in one embodiment, the wireless device WD is located at the intersection point of at least three access point regions R (three circles R1, R2 and R3 are shown in FIG. 1). In the illustrated embodiment, using the known coordinates ((xa, ya), (xb, yb) and (xc, yc)) of the access points AP1, AP2 and AP3 and the distances (da, db and dc) of the wireless device WD from the access points AP1, AP2 and AP3, three quadratic equations are formed with the client coordinates (x, y) (i.e., position of the wireless device WD) as the unknown variables. All that is left to do then is to solve them to get (x, y).

Now to calculate the distances (da, db and dc) of the wireless device WD from the access points AP1, AP2 and AP3, the RSSI values that are provided in the access point feed-reader are utilized. Specifically, to convert the RSSI values to the distances, a pathloss formula is applied. The pathloss or free space pathloss (FSPL) formula is a direct result from the Friss transmission formula and is used to calculate the total attenuation a wireless signal undergoes from the source to destination. There are variations of the pathloss formula which take different parameters into account. Thus, the present invention is not limited the following calculation of the distances (da, db and dc), and can calculate the distances (da, db and dc) based on a different pathloss formula based on different parameters.

In the illustrated embodiment, the formula used in the algorithm of the present disclosure is:

$$\text{Received RSSI } P_r = P_{tx} - 10 * n * \log_{10}(d)$$

$$\text{Distance } d = 10^{(P_{tx} - P_r)/10*n}$$

where $P_{tx}$ represents reference power (transmitter power) of the access points AP at a distance of 1 m, and n represents pathloss coefficient.

The main code of the algorithm of the present disclosure works on the information of the reference power at 1 m. In the illustrated embodiment, with the optimizing code of the algorithm, the reference power $P_{tx}$ and the pathloss coefficient n are optimized. These main and optimizing codes of the algorithm of the present disclosure can be applied to the dual band access points AP. The only difference that needs to be done for 2.4 and 5 GHz is that the reference power $P_{tx}$ can be reduced by 6.5 db for 5 GHz. This can reduce the computation and provide accurate enough information.

Referring now to FIG. 4, in the illustrated embodiment, the main code of the algorithm can include a trilateration code. In the illustrated embodiment, the controller 22 first sets the initial values of the reference power $P_{tx}$ (ptx) of the access points AP and the pathloss coefficient n (n) (step S40). In the illustrated embodiment, the main code includes the following code, for example:

```
ptx = -30.5      #Average wifi ap received signal at a distance of < 1 m
n = 2.5          #Pathloss coefficient
```

The average reference power for a wireless access point is usually between −30 to −45 dbm, and the indoor pathloss coefficient is usually 1.5-5. Thus, in the illustrated embodiment, the initial value of ptx is set to −30.5, while the initial value of n is set to 2.5 for indoor scenario. Of course, the initial values can be set to different values as needed and/or desired. Basically, the reference power can be taken by manually using a receiver near an access point and measuring the RSSI value. There are plenty of applications available which can enable this on a mobile device, which can then be used to measure the RSSI values at different points. However, depending on the layout and obstacles present, this may vary, hence a general range has been taken. The pathloss coefficient/exponent is a property of the pathloss formula and can have an impact on the end result. These values can be calculated both analytically using different probabilistic fading models (Rayleigh, Rice, Nakagami etc.) and empirically. However, for the sake of this code, initial values are determined from the lower end of the ranges. These initial values can be optimized through the optimizing code of the algorithm. Thus, after executing the optimizing code of the algorithm, the optimized values can be used as the initial value in step S40.

Next, the controller 22 obtains the client RSSI feeds (step S42). The client RSSI feeds are continuously provided from the access points AP1, AP2 and AP3 for the wireless devices WD through the network 14, and continuously stored in the data storage 24. The controller 22 reads out the RSSI values for the wireless devices WD from the data storage 24.

The controller 22 further calculates, for each wireless device WD, the distances from the access points AP1, AP2 and AP3 based on the pathloss model (step S44) to get three distance values (da, db, dc) from the access points AP1, AP2 and AP3, respectively (step S46). In the illustrated embodiment, the controller 22 utilizes the above-mentioned formula. Specifically, the main code can include the following code to calculate the distance values (da, db, dc) from the access points AP1, AP2 and AP3, respectively, based on the received RSSI values (rssi[0], rssi[1], rssi[2]) from the access points AP1, AP2 and AP3:

```
#Distance from AP1
x1 = (ptx-rssi[0])/(10*n)
da = pow(10,x1)
#Distance from AP2
x1 = (ptx-rssi[1])/(10*n)
db = pow(10,x1)
#Distance from AP3
x1 = (ptx-rssi[2])/(10*n)
dc = pow(10,x1)
```

Once the distance values (da, db, dc) for the wireless device WD are found, three equations with two unknown valuables about the distance between the wireless device WD and the access points AP1, AP2 and AP3 are obtained. The two unknown valuables are the position (x, y) of the wireless device WD, as shown in FIG. 1. The controller solves the equations to obtain the position (x, y) of the wireless device WD (i.e., estimated user position (xcorr, ycorr) in the following code) by the following code (step S48).

```
va = ((db*db-dc*dc) - (xb*xb-xc*xc) - (yb*yb-yc*yc)) / 2
vb = ((db*db-da*da) - (xb*xb-xa*xa) - (yb*yb-ya*ya)) / 2
temp1 = vb*(xc-xb) - va*(xa-xb)
temp2 = (ya-yb)*(xc-xb) - (yc-yb)*(xa-xb)
#Estimated user position:
ycorr = temp1 / temp2
xcorr = (va - ycorr*(yc-yb)) / (xc-xb)
print("X co-ordinate: ",xcorr)
print("Y co-ordinate: ",ycorr)
```

In the illustrated embodiment, the scripts are written in python script. However, as mentioned above, the present invention is not limited to or limited by this code and can also be realized by different programming language, for example. The above-mentioned process is repeated for each of the wireless devices WD to obtain the position (x, y) of each of the wireless devices WD.

The final piece in this main code is to calculate the root mean square error (RMSE) (step S50). The RMSE mathematically denotes the difference in the estimated client position and the actual position that it should be. The following code has been added to serve as an indicator of how accurate the calculated positions of the wireless devices WD are:

```
#RMSE part
aps = 3
mse = 0
for i in range(aps):
    dxcorr = pow((pow((xcorr-xp[i]),2)+pow((ycorr-yp[i]),2)),0.5)
    mse += pow((dxcorr-dmse[i]),2)
    #print(mse/(i+1))
rmse = pow((mse/aps),0.5)
print("RMSE: ",rmse)
```

Then, the controller 22 maps the calculated positions of the wireless devices WD on a floor map of the indoor space S (step S52).

Generally, the smaller the RMSE is, the more accurate the calculated positions of the wireless devices WD. This is because, while in an ideal case, the wireless devices WD are each located on the perfect intersection of the three circles R1, R2 and R3, that is not always the case. Hence the values calculated here, on their own cannot be taken as accurate. The RMSE can then be used to minimize this, by plugging in the obtained values to calculate the distance (dxcorr) from each access point AP for each wireless device WD. This is then compared to the distance (dmse=[da, db, dc]) obtained from the RSSI value in the previous step. However, it is like an average value in all directions and not in any fixed direction. The way it works is, that for different clients, the RMSE would be different. Hence using a few fixed clients, the user could change the radio transmission parameters to see which set of values results in the lowest RMSE for all wireless devices WD. This can then be used in a machine learning way to optimize the client locations. In the illustrated embodiment, the radio transmission parameters varied here are the reference power $P_{tx}$ of the access points AP and the pathloss coefficient n.

Once the calculated position is known, the controller 22 can then determine whether the wireless device is within a predetermined area PA in step S54. That is, the controller 22 can compare the position of the wireless device to known positions KP stored in the data storage 24. For example, the controller 22 can determine the position of the wireless device WD relative to known positions KP on the Premises PR of the property, such as adjacent or near the checkout position or in another location that can cause a waiting period. If the controller 22 determined that the wireless device has not entered the predetermined area, the controller can continue to map the coordinates of the wireless device in step S52. In one embodiment, in the controller 22 determines the wireless device WD as entered a known area, such as within a demarcated (predetermined) area PA designated as a checkout area, the controller can indicate that the wireless device is at time $T_0$ in step S56.

The controller 22 can then monitor the time T (i.e., a parameter) that the wireless device WD maintains a relative static position or within the demarcated (predetermined) area PA or in a position within a certain radius for a predetermined amount of time in step S58. In step S60 the controller determines whether the wireless device WD has maintained a position within the demarcated (predetermined) area PA. The controller 22 can calculate whether the wireless device WD has maintained a position within the demarcated (predetermined) area PA a static position by continually performing the position calculation discussed above. Moreover, in one embodiment, the controller 22 can calculate whether the wireless device WD has maintained a static position by continually performing the position calculation discussed above. If the position of the wireless device WD does not vary by a predetermined distance, the wireless device WD can be determined to maintain a static position. Moreover, the controller 22 can be programmed to include a variance distance that accounts for the wireless device WD moving in line. For example, the wireless device WD can move within the predetermined area PA having a predetermined diameter or dimensions and remain static for the purposes of calculation of the threshold time $T_{trshld}$ (predetermined parameter). Thus, as can be understood, the operator of the wireless device WD may be standing a line that moves, and thus while the wireless device WD is not completely static, a determination of wait time in a line for the registers can be calculated. If the wireless device has not maintained a position within the demarcated (predetermined) area PA or a static position, the controller can continue to map the coordinates of the wireless device in step S52.

In one embodiment, if the controller 22 determines that the wireless device has maintained a static position or a position within the demarcated (predetermined) area PA, the controller 22 calculates a time T that the wireless device WD remains static or within the demarcated (predetermined) area PA and compares that time T to a threshold or predetermined time $T_{trshld}$ in step S62. If the controller determines that the time T that the wireless device is within the demarcated (predetermined) area PA is less than the threshold time $T_{trshld}$, the controller can continue to monitor the time T that the wireless device stays within the demarcated (predetermined) area PA in step S58.

When the controller 22 determines that the wireless device WD has maintained a static position (or a position within a predetermined diameter of the initial position) such that time T is greater than the threshold time $T_{trshld}$ ($T > T_{trshld}$), the controller 22 can perform a mitigation operation in step S64. The mitigation operation can be any number of operations that automatically alerts or performs an operation to improve customer satisfaction. The mitigation operation can include issuing an alert to notify personal of the time the wireless device WD has remained within the demarcated (predetermined) area PA for a predetermined amount of time. The alert can be a communication to a computer or mobile device in the form or an email, a text message, or a tactile vibration to any similar device, which is displayed on the display of the computer C. The mobile device can be a smart phone, tablet, watch or any other suitable device. Moreover, the alert can be an audio or visual alert to notify staff members within a store, such a visible light or audio alert over a public or private audio network.

The mitigation operation can include automatically opening a self-checkout register, or selecting a closed register to open and assigning store personnel. For example, when the controller 22 determines that the wireless device WD has been in a static position for a time T that is greater than the threshold time $T_{trshld}$, the controller 22 can automatically open the closed register and notify store personal that a specific person has been selected to operate the register and to report immediately to the specific register. In these embodiment, the known position KP can be a checkout register that is open by store personal or automatically.

Thus, as can be understood, in this embodiment, once the controller 22 determines that the position of wireless device WD is at a predetermined position (e.g., the known position KP), and the parameter (i.e., the static time of the wireless device WD) meets a predetermined parameter (the threshold time $T_{trshld}$), the controller 22 performs a mitigation operation (e.g., opens a register).

Figure 5:
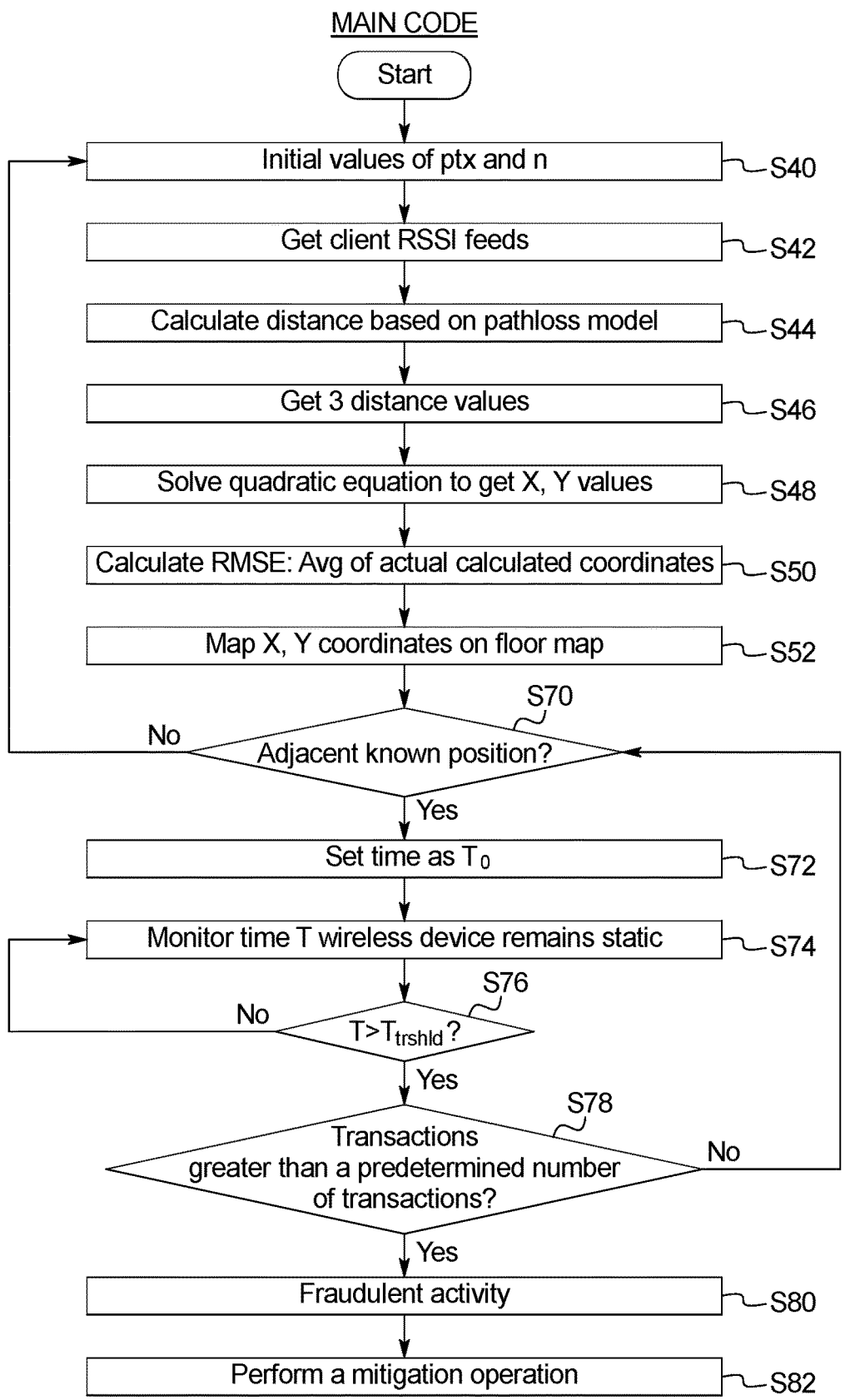
FIG. 5 is a flowchart of a code of a second embodiment of an algorithm of the operational analytics system shown in FIG. 1.

In another embodiment, as illustrated in FIG. 5, the operational analytics system can operate as a comprehensive fraud detection system. FIG. 5 has the same steps S40-S52 as in FIG. 4 and therefore will not be repeated here. As can be understood, once the controller 22 has determined the position of the wireless device WD on the floor map in step S52, the controller 22 can determine whether the wireless device is adjacent a known position KP, for example, a payment machine or other device, such as, a register, a fuel pump or other self-payment device or system in step S70. As can be understood, the payment device is generally a fixed device within or on the grounds of the store and thus is stored in the memory of the operational analytics system.

In other words, once a determination of the position of the wireless device WD is determined, the relative position to a known position KP (e.g., a payment device) can be determined by comparing the position of the wireless device WD to the stored position of the known position KP. When the controller 22 determines that the wireless device WD is not within a predetermined distance of (i.e. adjacent) the known position KP, the controller 22 can continue to map the coordinates of the wireless device in step S52. Therefore, the controller can calculate whether the wireless device is within a predetermined distance of the known position KP based on the mapped coordinates of the wireless device WD.

In one embodiment, if the controller 22 determines that the wireless device WD has maintained a position adjacent the known position KP, the controller 22 can indicate that the wireless device is at time $T_0$ in step S72. The controller 22 can calculate whether the wireless device WD has maintained a position adjacent the known position by continually performing the position calculation discussed above. Moreover, in one embodiment, the controller 22 can calculate whether the wireless device WD has maintained a static position by continually performing the position calculation discussed above.

Once the time has been set to $T_0$, the controller monitors the time the wireless device WD is static or adjacent the known position in step S74. The controller then calculates the time T that the wireless device WD remains static adjacent the known position KP and compares that time T to a threshold or predetermined time $T_{trshld}$ in step S76. In one embodiment, if the position of the wireless device WD does not vary by a predetermined distance, the wireless device WD can be determined to maintain a static position. For example, the wireless device WD can move within the predetermined area PA having a predetermined diameter or dimensions and remain static for the purposes of calculation of the threshold time $T_{trshld}$. If the controller determines that the time T that the wireless device is adjacent the known position KP is less than the threshold time $T_{trshld}$, the controller can continue to monitor the time T that the wireless device stays static adjacent the known position S74.

When the controller 22 determines that the wireless device WD has maintained a static position (or a position within an adjacent the known position KP) such that time T is greater than the threshold time $T_{trshld}$ ($T>T_{trshld}$), the controller 22 can determine whether a number of transactions at the known position KP (e.g. the register or fuel pump) is greater than the a predetermined number of transactions in step S78.

If the controller 22 determines that a number of transactions is less than a predetermined number of transactions, the controller 22 can continue to determine that the wireless device is adjacent the known position KP in step S70.

When the controller 22 determines that a number of transactions is greater than or equal to than a predetermined number of transactions, the controller 22 determines that fraudulent activity has likely occurring. In other words, when the wireless device WD is within a predetermined distance of (i.e. adjacent) the known position KP, the controller 22 can determine whether multiple transactions are occurring during the time the wireless device remains within a predetermined distance of the known position KP, i.e., adjacent the payment machine. In this embodiment, the controller 22 can be in communication with the payment device such that the number and type of transactions that have occurred at the payment device is within a predetermined or calculated time can be ascertained by the controller 22. Thus, if the controller 22 determines that a number of transactions have occurred that is greater than or equal to a predetermined number of transactions for a threshold time that a wireless device has maintained a position adjacent the payment machine, the controller 22 can determine that fraudulent activity or a likelihood of fraudulent activity is occurring or has occurred in step S80.

When the controller 22 has determined that fraudulent activity is occurring or has occurred, the controller 22 can perform a mitigation operation in step S82. For example, the controller 22 can cause an alert to be issued to store personal. The alert can be a communication to a computer or mobile device in the form or an email, a text message, or a tactile vibration to any similar device, which is displayed on the display of the computer C. The mobile device can be a smart phone, tablet, watch or any other suitable device. Moreover, the alert can be an audio or visual alert to notify staff members within a store, such a visible light or audio alert over a public or private audio network.

The mitigation operation can also include an automatic response to shut down the payment machine and/or confiscate any payment method (e.g. credit or debit card) that is within the payment machine.

Thus, as can be understood, in this embodiment, once the controller 22 determines that the position of wireless device WD is at a predetermined position (e.g., the known position KP), and the parameter (i.e., a number of transactions) meets a predetermined parameter (the predetermined number of transactions), the controller 22 performs a mitigation operation (e.g., cause an alert to be issued to store personal).

As can be understood, the operational analytics system 10 can therefore alert a store to possible credit card fraud across multiple card brands but can also protect against fraudulent transactions (e.g. loyalty redemptions). By analyzing customer behavior for deviations from normal behavior, the operational analytics system 10 can have an expanded ability to detect criminal activity.

Moreover, as can be understood, some types of suspected fraud are not immediately visible from analysis of data from a single store. The operational analytics system 10 can analyze a variety of data sources across a plurality of stores. If a typical customers usually buy a product (e.g., gas) two to three times a week with the same credit/debit card, the operational analytics system can perform a mitigation operation (e.g., an alert) to a store employee to the presence of a user in the possession of a wireless device WD who is buying the same product more than two or three times (e.g., 20 times) in one week across a plurality of stores using a plurality of credit/debit cards. Alerts can be prioritized based on the magnitude of impact to the business.

Figure 6:
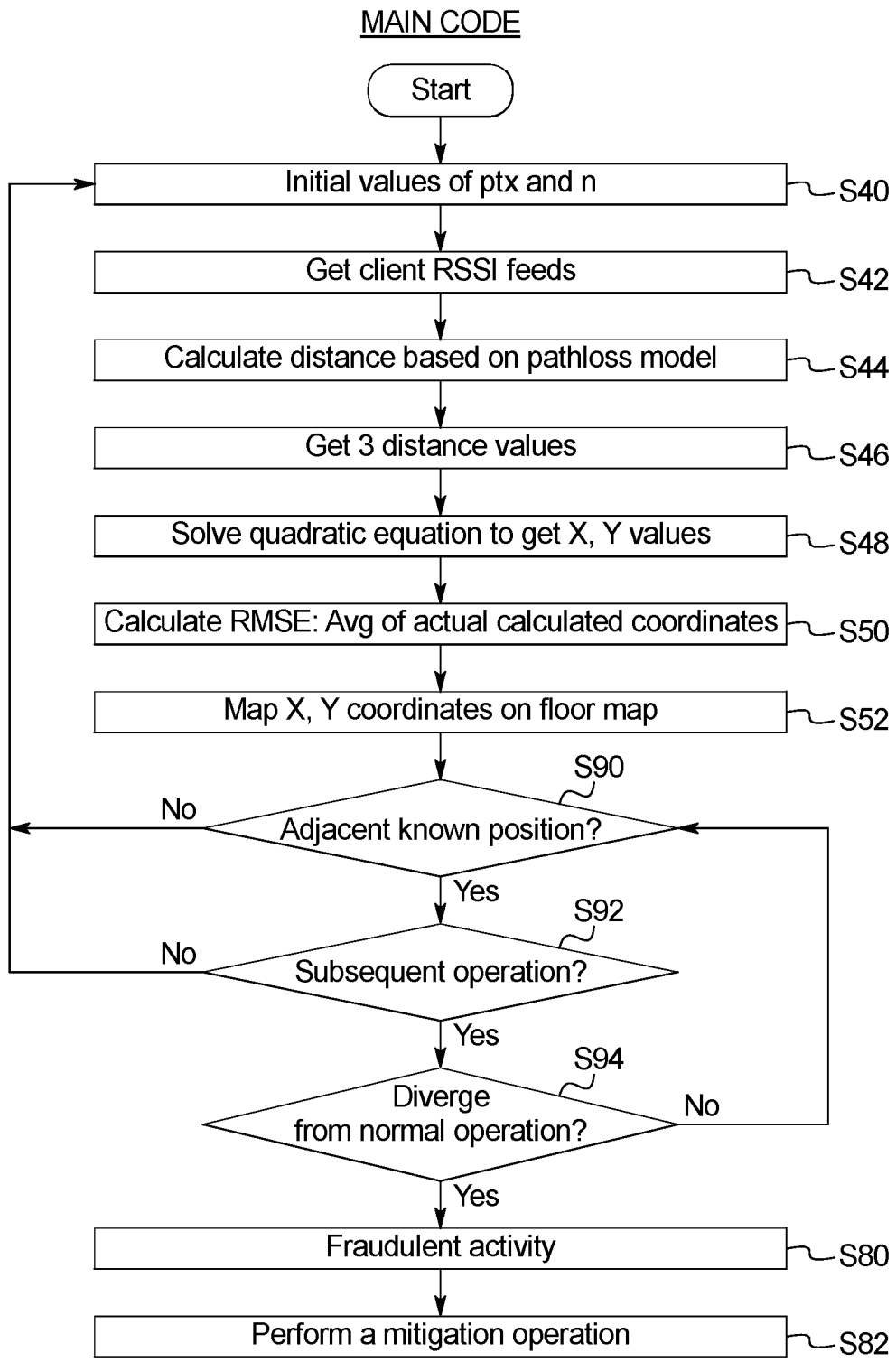
FIG. 6 is a flowchart of a code of a third embodiment of an algorithm of the operational analytics system shown in FIG. 1.

Such as embodiment is illustrated in FIG. 6. As shown in FIG. 6, the operational analytics system can operate as a comprehensive fraud detection system. FIG. 5 has the same steps S40-S52 as in FIG. 4 and therefore will not be repeated here. As can be understood, once the controller 22 has determined the position of the wireless device WD on the floor map in step S52, the controller 22 can determine whether the wireless device is adjacent a known position KP, for example, a payment machine or other device, such as, a register, a fuel pump or other self-payment device or system in step S90. As can be understood, the payment device is generally a fixed device within or on the grounds of the store and thus is stored in the memory of the operational analytics system.

In other words, once a determination of the position of the wireless device WD is determined, the relative position to a known position KP (e.g., a payment device) can be determined by comparing the position of the wireless device WD to the stored position of the known position KP. When the controller 22 determines that the wireless device WD is not within a predetermined distance of (i.e. adjacent) the known position KP, the controller 22 can continue to map the coordinates of the wireless device in step S52. Therefore, the controller can calculate whether the wireless device is within a predetermined distance of the known position KP based on the mapped coordinates of the wireless device WD.

When the controller 22 determines that the wireless device is adjacent the known position KP, the controller can determine whether the wireless device is performing an subsequent operation at step S92. In other words, the operations of the wireless device 22 can be stored in the storage 24. Accordingly, when the wireless device is adjacent multiple payment devices (e.g., gas pumps or registers) across multiple stores, the controller 22 can determine that the wireless device is making multiple transactions. If the controller 22 determines that the user of the wireless device WD is not making a subsequent transaction, the controller 22 can continue monitor the position of the wireless device by restarting the process at step S40. If the controller determines that the user of the wireless device WD is making a subsequent transaction, the controller can determine whether the subsequent transaction diverges from normal operation in step S94. In other words, the controller 22 can be programmed such that a normal operation, for example, can be purchasing fuel or groceries or other products at approximately once a week. This data can be prestored in the storage 24 or accumulated by monitoring activities of the users of the wireless device. In another example, the controller 22 can be preprogrammed with or have stored therein credit card information. The controller can be further programmed or "learn" through data collection that that credit card is used approximately once a week for purchasing fuel or groceries or other products. The controller 22 will register or "learn" that this activity as "normal". Thus, if the controller determines that a wireless device is performing multiple purchases across multiple registers or at multiple fuel pumps, the controller can determine that the wireless device is diverging from normal operations.

If the controller 22 determines that there is a divergence from normal operations, the controller can cause a mitigation operation to be performed. As can be understood, a mitigation operation can be notification of the store owner or credit card owner or credit card company of potential fraud. As discussed herein, the alert can also be a communication to a computer or mobile device in the form or an email, a text message, or a tactile vibration to any similar device, which is displayed on the display of the computer C. The mobile device can be a smart phone, tablet, watch or any other suitable device. Moreover, the alert can be an audio or visual alert to notify staff members within a store, such a visible light or audio alert over a public or private audio network.

The mitigation operation can also include an automatic response to shut down the payment machine and/or confiscate any payment method (e.g. credit or debit card) that is within the payment machine.

Thus, as can be understood, in this embodiment, once the controller 22 determines that the position of wireless device WD is at a predetermined position (e.g., the known position KP), and the parameter (i.e., a number of transactions) meets a predetermined parameter (the predetermined number of transactions), the controller 22 performs a mitigation operation (e.g., cause an alert to be issued).

As can be understood, the operational analytics system 10 can therefore alert a store to possible credit card fraud across multiple card brands but can also protect against fraudulent transactions (e.g. loyalty redemptions). By analyzing customer behavior for deviations from normal behavior, the operational analytics system 10 can have an expanded ability to detect criminal activity.

As can be understood from FIG. 6, an electronic controller 22 at a first store (or first access device) after receiving a signal strength indicator for the wireless device WD from the plurality of access point devices AP at the first store, can calculate a position of wireless device WD based on the signal strength indicator for the wireless device WD, determine a time the wireless device WD remains within a predetermined distance of the position—i.e., adjacent a payment machine, and when that time exceeds a threshold time determine that a transaction is occurring or has occurred. Then subsequently, the electronic controller 22 at a second store (second access device) after receiving a signal strength indicator for the wireless device WD from the plurality of access point devices AP at the second store, can calculate a position of wireless device WD based on the signal strength indicator for the wireless device, determine a time the wireless device WD remains within a predetermined distance of the position—i.e., adjacent a payment machine and when the time exceeds a threshold time, and that a transaction is occurring or has occurred, which is a subsequent operation divergent from normal operation, and perform a mitigation operation. As noted above, the mitigation operation can be an alert issued to store personal. The alert can be a communication to a computer or mobile device in the form or an email, a text message, or a tactile vibration to any similar device. The mobile device can be a smart phone, tablet, watch or any other suitable device. Moreover, the alert can be an audio or visual alert to notify staff members within a store, such a visible light or audio alert over a public or private audio network.

The mitigation operation can also include an automatic response to shut down the payment machine and/or confiscate any payment method (e.g. credit or debit card) that is within the payment machine.

In one embodiment, the mitigation operation can be any number of operations that automatically alerts or performs an operation to improve customer satisfaction. The mitigation operation can include issuing an alert to notify personal of the time the wireless device WD has remained within the demarcated (predetermined) area PA for a predetermined amount of time. The alert can be a communication to a computer or mobile device in the form or an email, a text message, or a tactile vibration to any similar device, which is displayed on the display of the computer C. The mobile device can be a smart phone, tablet, watch or any other suitable device. Moreover, the alert can be an audio or visual alert to notify staff members within a store, such a visible light or audio alert over a public or private audio network.

In one embodiment, the access point devices are not only configured to receive a wireless signal for wireless devices WD, the access point devices AP1-AP3 can receive a wireless signal from a product P in inventory. That is the store can have products in inventory that have a passive or active transmitter that enables an access point devices AP1-AP3 to track and locate the product P in the store using the same methodology and calculations described herein for the wireless device WD. Thus, the controller 22 can track a position of the product P from the information received from plurality of access point devices AP1-AP3.

Figure 7A:
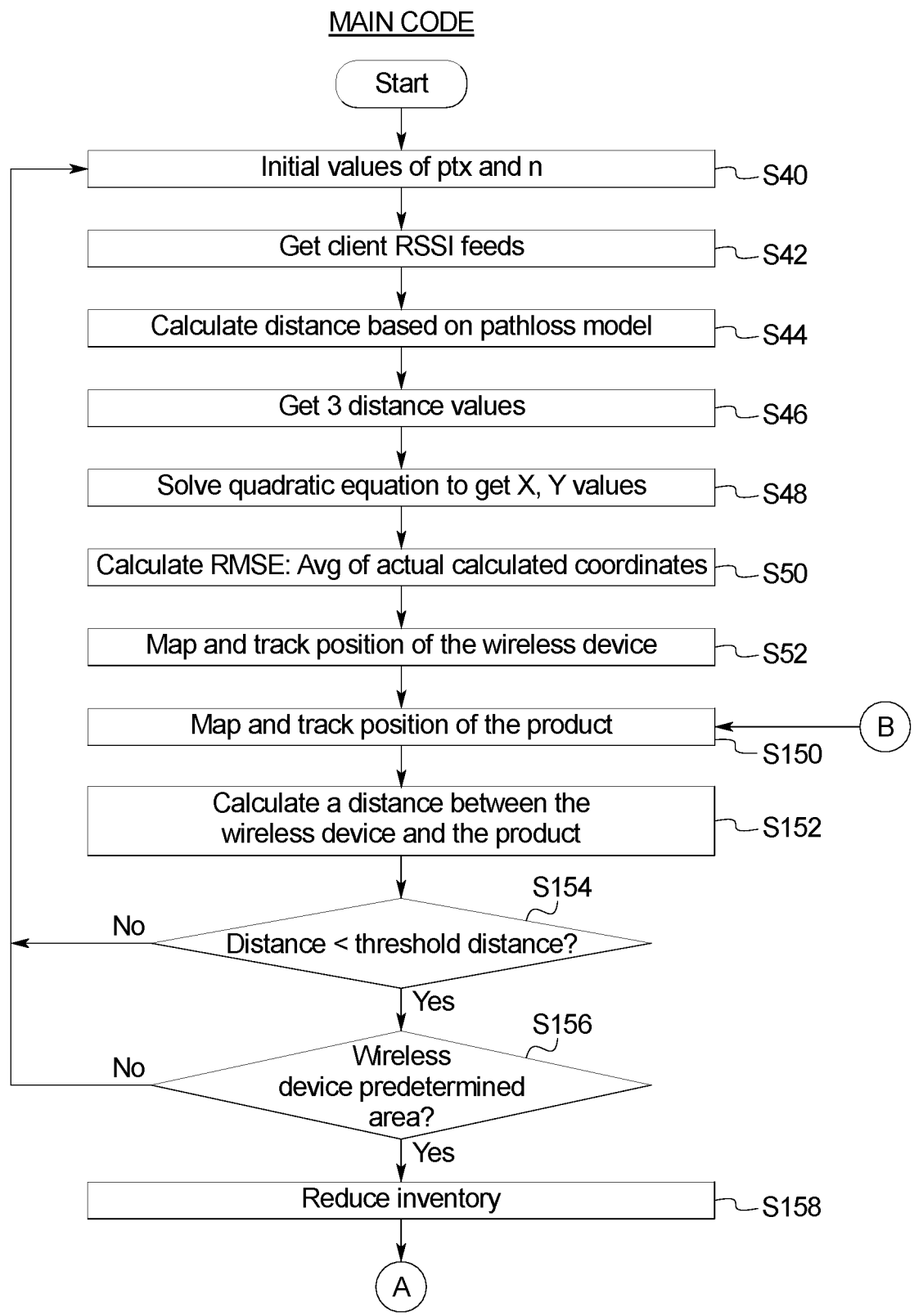
FIGS. 7A and 7B are a flowchart of a code of a fourth embodiment of an algorithm of the operational analytics system shown in FIG. 1.
Figure 7B:
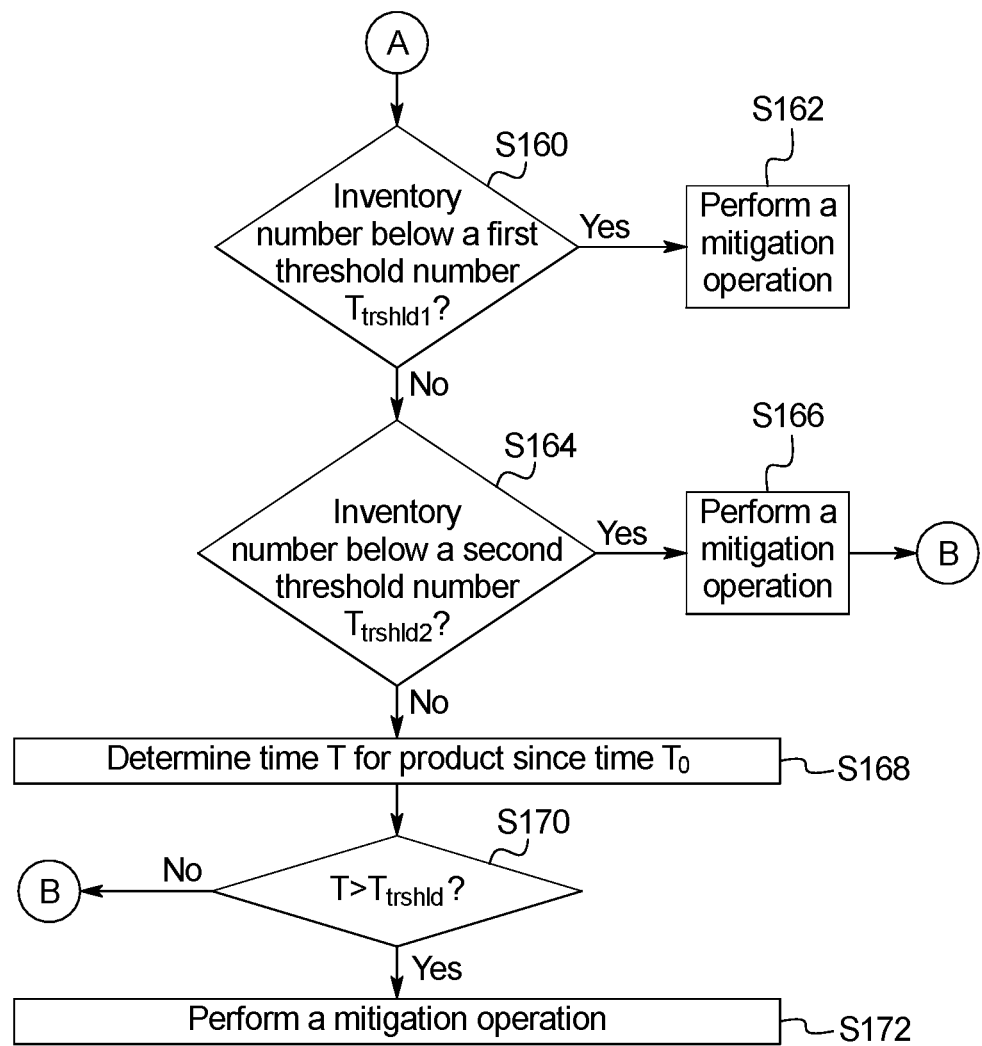

FIGS. 7A and 7B have the same steps S40-S52 as in FIG. 4 and therefore will not be repeated here. As can be understood, once the position of the wireless device WD is determined the position of the product P can be determined in step S150 in a similar manner as the position of the wireless device WD is determined in steps S40-S52. That is, the calculation of the map coordinates for the wireless device can be applied to the map coordinates of the product P. The controller 22 can calculate a distance between the tracked position of the wireless devices WD and the tracked position of the product P in step S152. That is, once the controller 22 has calculated the map coordinates for both the product P and the wireless device WD, the controller can determine the distance between map coordinates for the product P and the map coordinates for the wireless device WD.

In step S154 the controller can determine whether the distance between the product and the controller is less than a predetermined or threshold distance store in the storage 24. When the distance between map coordinates for the product P and the map coordinates for the wireless device WD is not less than the threshold distance the controller 22 can continue to map and track the position of the wireless device in steps S40-S52.

When the distance between the of tracked position of a wireless device WD of the wireless devices and the tracked position of the product P is below the threshold distance, the controller 22 can determine whether the wireless device WD is within a predetermined or demarcated area. That is, the controller 22 can compare the position of the wireless device WD to known positions KP stored in the data storage 24. For example, the controller 22 can determine the position of the wireless device WD relative to known positions KP on the Premises PR of the property, such as adjacent or near the checkout position or in another location. If the controller 22 determined that the wireless device has not entered the predetermined area, the controller can continue to map and track the position of the wireless device in steps S40-S52. In one embodiment, in the controller 22 determines the wireless device WD as entered a known area, such as within a demarcated (predetermined) area PA designated as a checkout area, the controller can reduce a number of the product P in inventory in step S158.

The controller can then in step S160 determine whether the product P in inventory is below a first threshold number $T_{Thshld1}$. When the controller 22 determines that the product P in inventory is below the first threshold number $T_{Thshld1}$, the controller 22 can perform a mitigation operation in step S162. Here, the mitigation operation can be an alert related to low product inventory. However, the mitigation operation can be any number of operations that automatically alerts or performs an operation to improve store operations. The mitigation operation can include issuing an alert to notify personal of inventory issues. The alert can be a communication to a computer or mobile device in the form or an email, a text message, or a tactile vibration to any similar device, which is displayed on the display of the computer C. The mobile device can be a smart phone, tablet, watch or any other suitable device. Moreover, the alert can be an audio or visual alert to notify staff members within a store, such a visible light or audio alert over a public or private audio network. Moreover, the mitigation operation can be automatically ordering new inventory.

When the inventory number is not below the first threshold number $T_{Thshld1}$, the controller 22 can determine the whether the inventory is below a second threshold number $T_{Thshld2}$ in step S164. If the product in inventory is below a second threshold number $T_{Thshld2}$, the controller can perform a mitigation operation in step S166 and continue to map and track the position of wireless devices WD in steps S40-S52. Here the mitigation operation can be an alert indicating the successful depletion of product. However, the mitigation operation can be any number of operations that automatically alerts or performs an operation to improve store operations. The mitigation operation can include issuing an alert to notify personnel of inventory issues. The alert can be a communication to a computer or mobile device in the form or an email, a text message, or a tactile vibration to any similar device, which is displayed on the display of the computer C. The mobile device can be a smart phone, tablet, watch or any other suitable device. Moreover, the alert can be an audio or visual alert to notify staff members within a store, such a visible light or audio alert over a public or private audio network. Moreover, the mitigation operation can be automatically storing the information in the storage device 24 for comparison to the product P in other stores or other products to help determine analytics and success of store placement and/or product desirability. For example, the controller can cause the stored information to be transmitted to a plurality of stores for comparison and improvement of store analytics.

If the product P is not below the second threshold number $T_{Thshld2}$, the controller can determine a time T from a time $T_0$ for the product in step S168. In step S170 the controller determines whether the time T is greater than a threshold time $T_{trshld}$. When the time T is not greater than the threshold time $T_{trshld}$, the controller 22 can continue to map and track wireless devices WD in steps S40-S52. When the controller determines that the time T is greater than the threshold time $T_{trshld}$, the controller 22 can perform a mitigation operation. The mitigation operation can include issuing an alert to notify personal of a failure to meet the threshold number in the predetermined time. In this embodiment, the appropriate store managers can be proactively alerted to confirm compliance with the in-store planograms and employee training requirements.

In other words, the controller 22 is configured to determine whether a certain product is being purchased with an expected or desired regularity. For example, by determining a distance between a product P and a wireless device WD, the controller 22 can determine if the product is being moved by a customer and where the product is being moved. If the controller 22 determines that the product P has been moved to a register or in a position past the register adjacent to or outside of an exit (e.g., a predetermined location or area), the controller 22 can determine that the product P has been purchased. The controller 22 can perform this calculation for several or a plurality of units of product P or for all or some inventory. In other words, the controller 22 can not only determine how many of a certain product is being purchased, but a comparative analysis of the rate the inventory is being depleted and whether new product must be ordered.

The controller 22 can determine whether a promotion of a specific product or products is performing below standards. Moreover, the controller 22 can provide data that enables a determination of whether a specific store or group of stores is performing below standards in comparison to the other stores. Moreover, the mitigation operation can be automatically storing the information in the storage device 24 for comparison to the product P in other stores or other products to help determine analytics and success of store placement and/or product desirability. For example, the controller can cause the stored information to be transmitted to a plurality of stores for comparison and improvement of store analytics.

Figure 8:
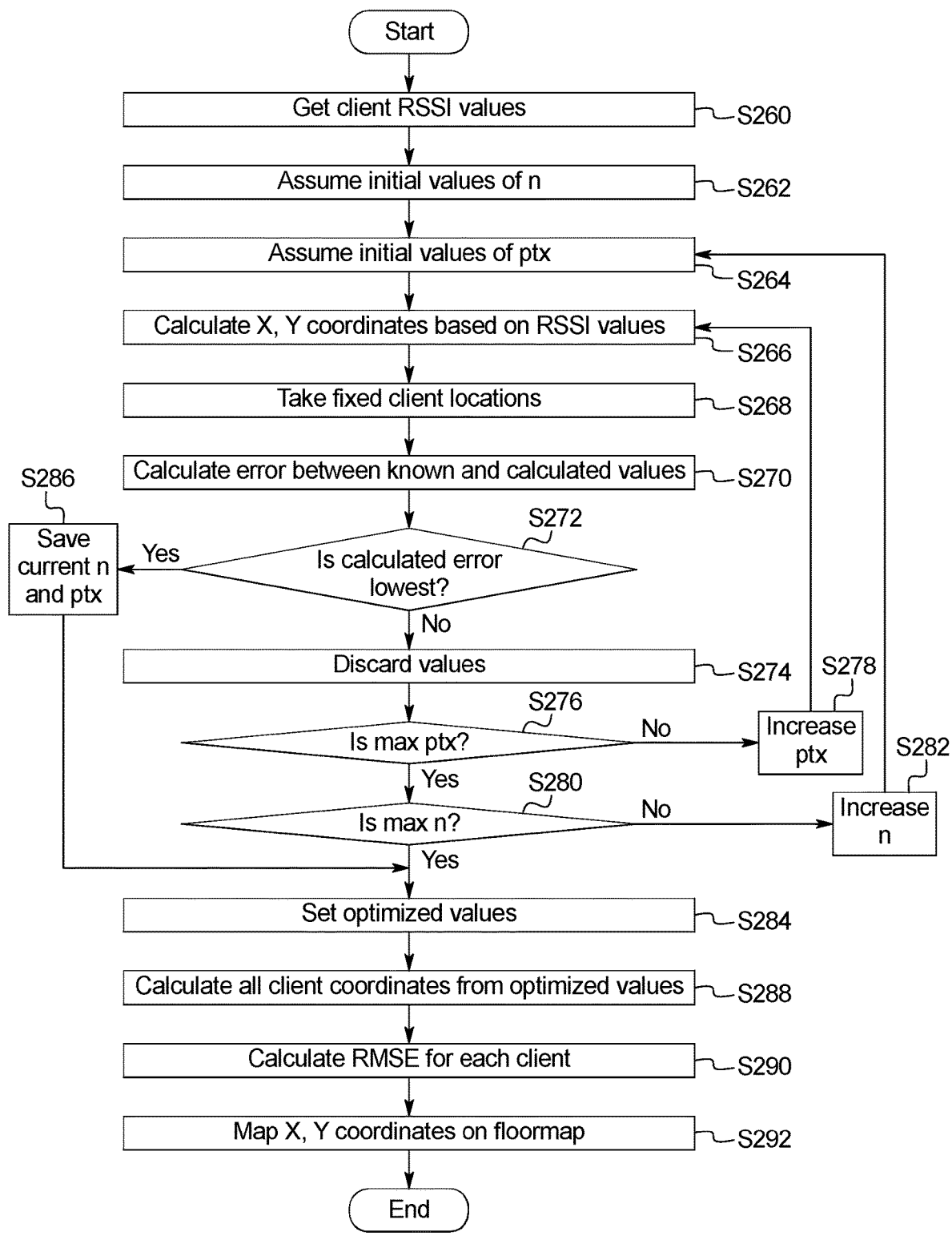
FIG. 8 is a flowchart of an optimizing code of the operational analytics algorithm of the operational analytics system shown in FIG. 1.

Referring now to FIG. 8, the optimizing code of the algorithm of the present disclosure will be explained for calculating and mapping the coordinates on the premises of the property. This optimizing code optimizes the trilateration code by finding the optimum set of the radio transmission parameters for each floor map. As mentioned above, the output of the main code depends on the initial values of the radio transmission parameters (i.e., the reference power $P_{tx}$ and pathloss coefficient n). Since they can be a general range, the optimizing code determines a fixed set of the radio transmission parameters by using a set of reference wireless devices of the wireless devices. The reference wireless devices can be a fixed wireless device whose position is predetermined and prestored in the data storage 24. However, the present invention is not limited to or limited by this code and can also be realized by different programming language, for example.

In the illustrated embodiment, as illustrated in FIG. 8, the controller 22 first obtains the client RSSI feeds (step S260). The client RSSI feeds are continuously provided from the access points AP1, AP2 and AP3 for the wireless devices WD including the reference wireless devices through the network 14, and continuously stored in the data storage 24, for example. The controller 22 reads out the RSSI values for the wireless devices WD from the data storage 24, for example.

Next, the controller 22 sets the initial values of the pathloss coefficient n (n) (step S262), and the initial values of the reference power $P_{tx}$ (ptx) of the access points AP (step S264).

Then, the controller 22 calculates the position (x, y) of each of the wireless devices WD including the reference wireless devices according to the standard trilateration code explained through steps S44 to S48 in FIG. 4 (step S266). In particular, the controller 22 calculates the position (x, y) of each of the wireless devices WD including the reference wireless devices based on the RSSI values, the pathloss coefficient n and the reference power $P_{tx}$.

Furthermore, the controller 22 reads out the actual or prestored position (x, y) of each of the reference wireless devices from the data storage 24 (step S268), and compares the calculated positions (x, y) of the reference wireless devices calculated in step S266 with the actual or prestored positions (x, y) of the reference wireless devices obtained in step S268 (step S270). Specifically, the controller 22 calculates an average of the positional errors (i.e., distances) between the calculated position (x, y) and the actual position (x, y) for the reference wireless devices.

These steps are repeated for all possible vales of the radio transmission parameters within the general range, or are repeated until the calculated average of the positional errors becomes the lowest.

Specifically, the controller 22 determines whether the calculated average of the positional errors becomes the lowest (step S272). If the controller 22 determines that the calculated average of the positional errors is not the lowest ("No" in step S272), then the controller 22 discards calculated values (step S274) and determines whether the number of count of the loop has reached its maximum value (step S276). In the illustrated embodiment, the maximum value is set to 10, for example. If the controller 22 determines that the number of count of the loop for setting the reference power $P_{tx}$ (ptx) has not reached its maximum value ("No" in step S276), then the controller 22 increases the set value of the reference power $P_{tx}$ (ptx) by a predetermined value, such as 0.5 (step S278), and the process returns to step S266.

On the other hand, if the controller 22 determines that the number of count of the loop has reached its maximum value ("Yes" in step S276), then the controller 22 determines whether the number of count of the loop for the pathloss coefficient n (n) has reached its maximum value (step S280). In the illustrated embodiment, the maximum value is set to 10, for example. If the controller 22 determines that the number of count of the loop has not reached its maximum value ("No" in step S280), then the controller 22 increases the set value of the pathloss coefficient n (n) by a predetermined value, such as 0.25 (step S282), and the process returns to step S264 and the above-mentioned processes are repeated.

Furthermore, if the controller 22 determines that the number of count of the loop has reached its maximum value ("Yes" in step S280), then the controller 22 sets the current values of the reference power $P_{tx}$ (ptx) and the pathloss coefficient n (n) as the optimized values of the radio transmission parameters (step S284).

On the other hand, if the controller 22 determines that the calculated average of the positional errors becomes the lowest ("Yes" in step S72), then the controller 22 saves the current values of the reference power $P_{tx}$ (ptx) and the pathloss coefficient n (n) (step S86), and sets the current values of the reference power $P_{tx}$ (ptx) and the pathloss coefficient n (n) as the optimized values of the radio transmission parameters (step S284).

Furthermore, the controller 22 calculates the position (x, y) of each of the wireless devices WD based on the optimized values of the radio transmission parameters (step S288). Specifically, the controller 22 calculates the position (x, y) of each of the wireless devices WD according to the standard trilateration code explained through steps S44 to S48 in FIG. 4 using the optimized values of the radio transmission parameters. Then, the controller 22 calculates the RMSE in a manner same as step S50 (step S290), and maps the calculated positions of the wireless devices WD on a floor map of the premises PR in a manner same as step S52 (step S292).

In the illustrated embodiment, the set of values of the radio transmission parameters that show the least error can be used for each floor map. Each floor map is different, and needs different sets of values of the radio transmission parameters. Thus, the optimizing code of the algorithm of the present disclosure is run once per floor map to determine optimized values of the radio transmission parameters for the floor map, and the algorithm can be customized for each environment. Furthermore, after determining the optimized values of the radio transmission parameters for the floor map, these optimized values are utilized as the initial values of the radio transmission parameters for the main code of the algorithm.

Figure 9:
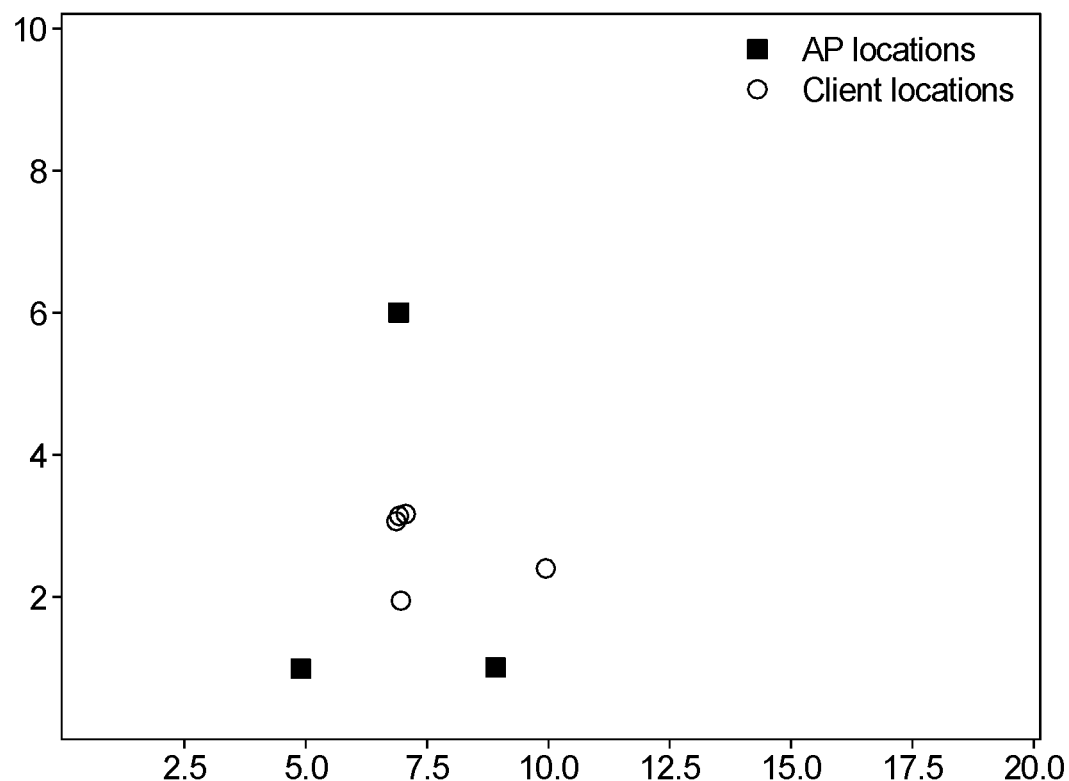
FIG. 9 illustrates a diagram of calculation results of an operational analytics algorithm in accordance with a comparative example, illustrating access point locations and client locations determined by the operational analytics algorithm in accordance with the comparative example.
Figure 10:
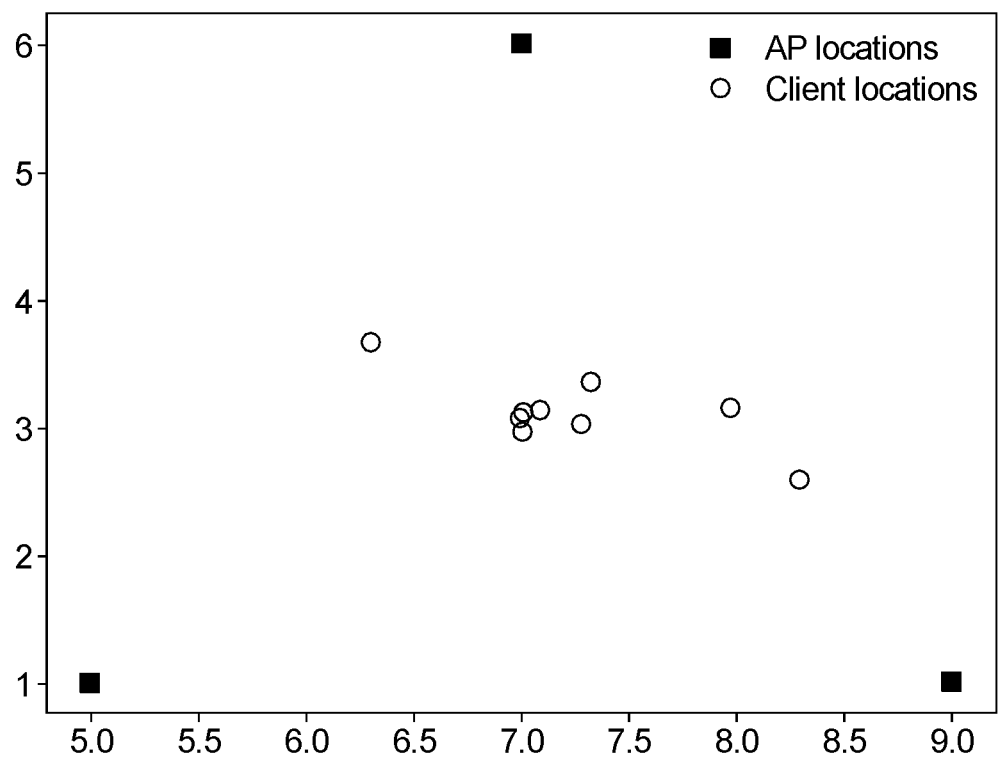
FIG. 10 illustrates a diagram of calculation results of the operational analytics algorithm in accordance with the one embodiment of the present disclosure, illustrating access point locations and client locations determined by the operational analytics algorithm in accordance with the one embodiment of the present disclosure.

Referring now to FIGS. 9 and 10, the location mapping results of the algorithm will be explained. FIG. 9 illustrates location mapping results using the trilateration code with initial values (ptx=−30 dbm, n=2), while FIG. 10 illustrates location mapping results using the trilateration code with optimized values (ptx=−34.5 dbm, n=4.25) that are determined through the optimizing code of the algorithm of the present disclosure.

FIG. 9 shows that all the client locations are clumped together around the middle, while FIG. 10 shows that there are not only more client locations seen separately but they are also more spread out. Furthermore, the average RMSE in the case shown in FIG. 9 is 27, while the average RMSE in the case shown in FIG. 10 is 1.42, which shows the difference in performance between the two cases.

Thus, with the optimizing code of the algorithm, as shown in FIG. 10, the positions of the wireless devices WD on the floor map can be accurately identified. In the illustrated embodiment, the optimization of the radio transmission parameters is performed for 10 levels. In other words, 10 different values are tested for each radio transmission parameters. In the illustrated embodiment, for this setup, the pathloss coefficient n (n) has been found to have a major effect on the RMSE relative to the reference power $P_{tx}$ (ptx).

Of course, the optimized value can be different for different setup. For example, in one case, according to the pathloss algorithm, the reference power of the access point is around −30 dbm, while the Aruba solution predicts it to be around −45 dbm, with pathloss coefficient around 1.5 to 2. On the other hand, in this case, with the optimizing code of the algorithm, the optimized value of the reference power $P_{tx}$ is −39 dbm and the optimized value of the pathloss coefficient n is 4.4.

Figure 11:
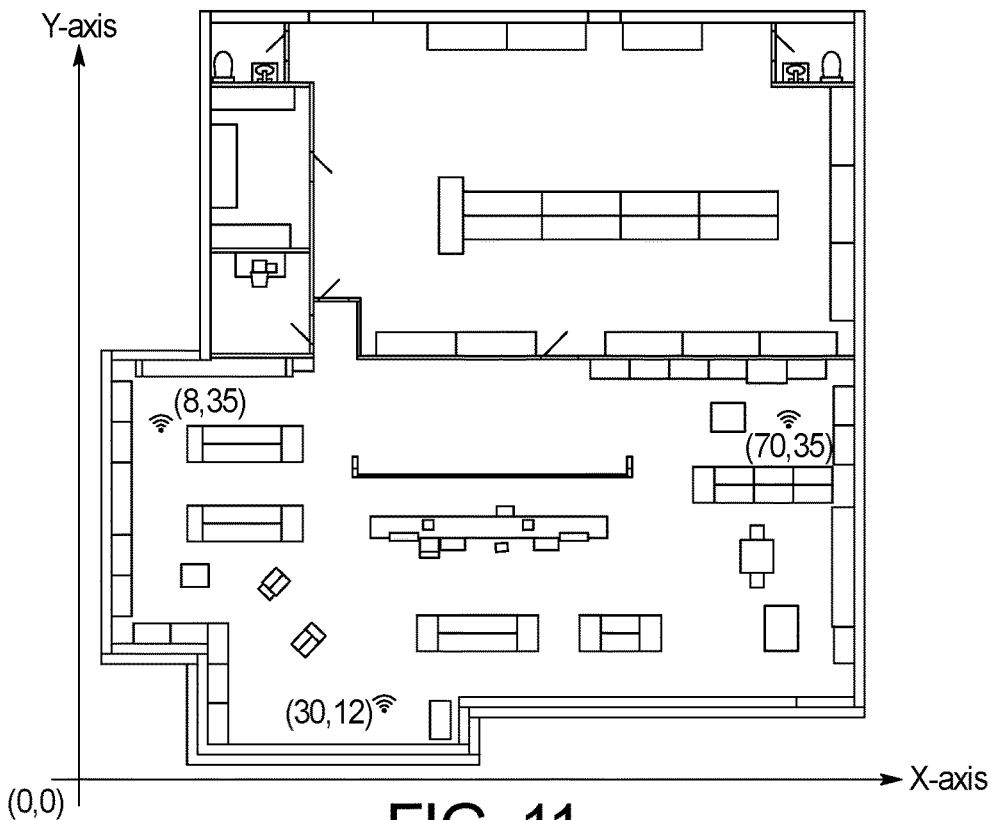
FIG. 11 illustrates a diagram of a floor map of an indoor space of a store, in which access points are installed.
Figure 12:
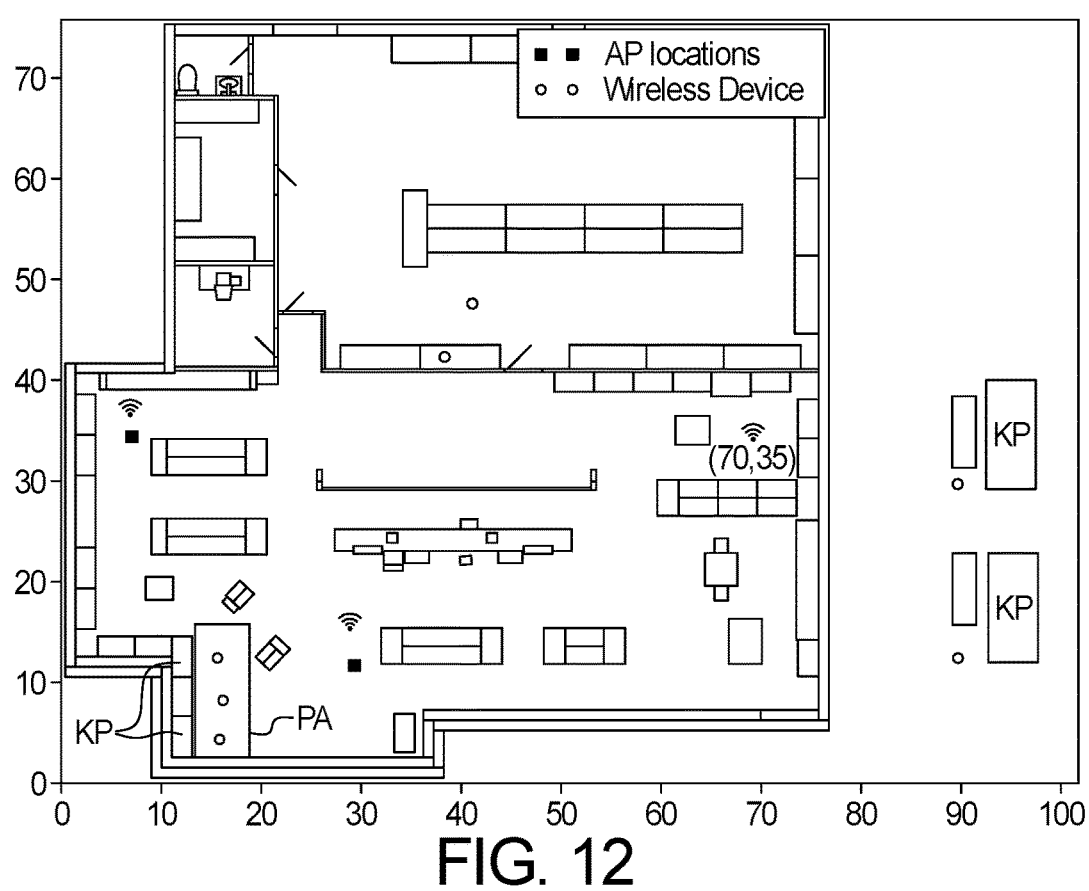
FIG. 12 illustrates a diagram of the floor map of the indoor space of the store shown in FIG. 11, illustrating location mapping results of the operational analytics algorithm in accordance with a comparative example.
Figure 13:
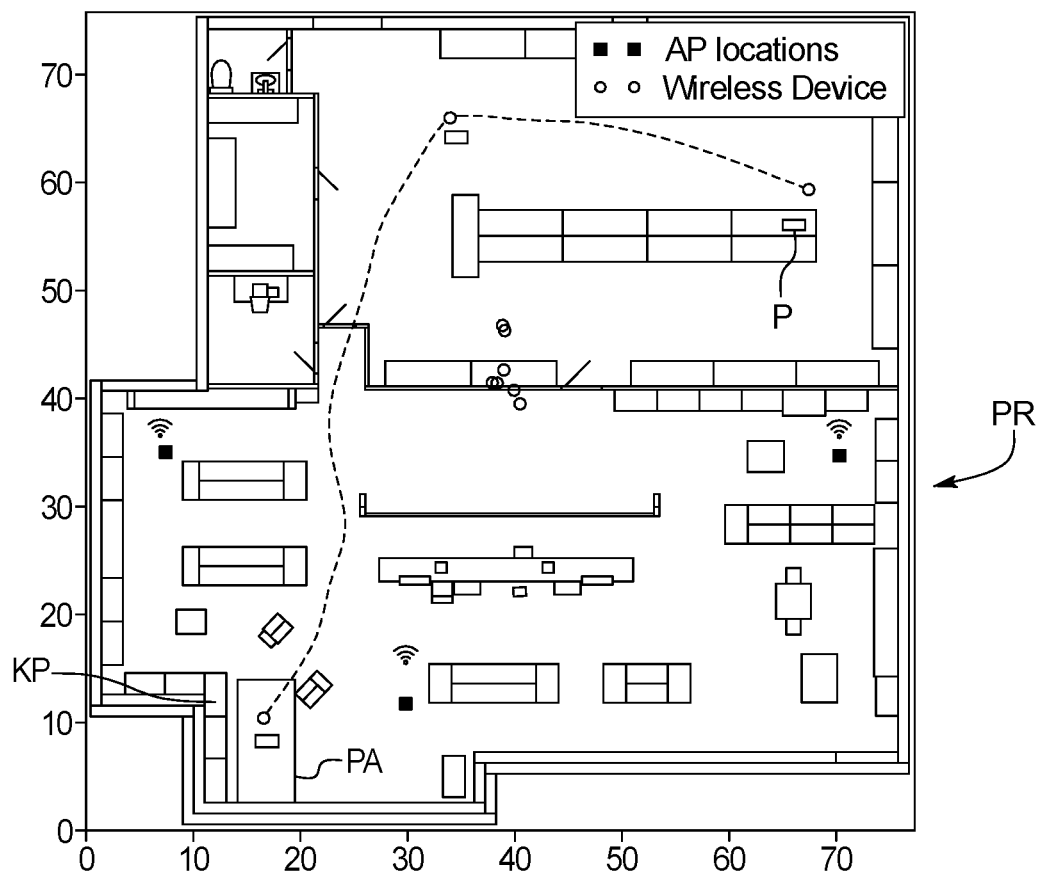
FIG. 13 illustrates a diagram of the floor map of the indoor space of the store shown in FIG. 11, illustrating location mapping results of the operational analytics algorithm in accordance with the one embodiment of the present disclosure.

Furthermore, FIGS. 11-13 illustrate store floor map images on which the location mapping results are overlaid to show a positioning and/or track of the customer traffic flow in the floor map based on wireless device WD positioning and tracking. Specifically, the store floor map image can be provided by the server 12, and be displayed on a display of a user, such as a manager of the store, who is accessible to the operational analytics system 10 via the network 14.

FIG. 11 illustrates the store floor map image on which three access points are located. FIG. 12 illustrates the store floor map image on which the location mapping results obtained by the algorithm utilizing information of the three access points AP1, AP2 and AP3. Referring to FIG. 12, it can be seen that with the algorithm of the present disclosure, has determined the position of several wireless devices WD. In this embodiment, as discussed above, the controller 22 can determine that the wireless devices WD are adjacent known positions KP or within the predetermined area PA. As discussed above and as set forth in the algorithm of FIG. 4 and FIG. 5, once the controller determines that the wireless device has, for example, been waiting a predetermined amount of time or is possibly committing fraudulent activity, the controller can perform a mitigation operation, as discussed herein.

FIG. 13 illustrates the store floor map image on which the location mapping results obtained by the algorithm utilizing information of the three access points AP1, AP2 and AP3. Referring to FIG. 13, it can be seen that with the algorithm of the present disclosure, has determined the position and track of a wireless device WD and a product P. In this embodiment, as discussed above, the controller 22 can determine that the wireless device WD and the product P have maintained less than a threshold distance while being tracked and have reached the predetermined area. Once at the predetermined area, the controller 22 can determine that the product has been purchased and perform a mitigation operation as discussed above for FIG. 4. Moreover, the controller 22 can perform this calculation for multiple units of the product P, thus enabling the controller 22 to monitor and analyze the purchasing history of the product P.

By automating the continuous process of analyzing both business and technical data, the operational analytics system 10 will enable retailers to respond to real-time localized changes. For example, since the information accumulated by the operational analytics system 10 can be shared within other stores within, when one store improves its business results, the store's data can be transmitted to another store or a plurality of stores, which can immediately influence the performance standards for the other stores, as well as become part of the local trend.

Moreover, if the operational analytics system 10 analysis indicates behavior outside normal or expected limits, then pre-determined (and retail validated) local actions can be suggested for real-time intervention. For example, as discussed herein, when the customer checkout wait times (as identified by dwell time in the checkout area) in a lower-performing stores exceeds the standard set by higher-performing stores by some preset threshold, the store managers can receive an automated alert highlighting the discrepancy and suggesting a mitigation operation (i.e., the correct action, e.g. add more check out cashiers). In another example, if a promotion at a specific group of stores is performing below standards in comparison to the rest of the brand, the appropriate store managers may be proactively alerted to confirm compliance with the in-store planograms and employee training requirements.

Continual analysis by the operational analytics system 10 will enable improved accuracy and relevance of corrective actions. Further the operational analytics system 10 can be a self-learning system. Other data sources, such as Point of Sale (POS), video analytics, traffic counters, bluetooth beacons, IoT sensors, and weather, may also be integrated to improve the accuracy and expand the scope of the insights.

To establish industry benchmarks, the operational analytics system 10 can use machine learning analysis of broader data sets from a plurality of stores.

The operational analytics system 10 will enables automated, real-time analysis of deviant customer behavior and be capable of notify store managers of potentially fraudulent activity. For example, at a register or at a gas station pump, if a customer is conducting numerous transactions sequentially at the same dispenser, this may indicate a customer purchasing multiple products or filling a gas container or tank with stolen credit cards. The operational analytics system 10 is capable of detecting this activity by detecting the numerous POS transactions of different credit cards correlated to the same Wi-Fi device positioned at the same dispenser station for extended periods of time, as discussed above.

While it is understood that some card brands can provide fraud detection services today, such services are only able to analyze the transactions conducted within their individual branded cards. The operational analytics system 10 can not only alert the store against credit card fraud across multiple card brands but can also protect against fraudulent transactions that do not use credit cards (e.g. loyalty redemptions). By analyzing customer behavior for deviations from the norm the operational analytics system 10 can have an expanded ability to detect criminal activity.

Some types of suspected fraud may be an analytical outcome, not immediately visible from analysis of data from a single store. As discussed herein, the operational analytics system 10 can analyze a variety of data sources across an entire market of store operators. For example, if typical customers usually buy product or gas two to three times a week with the same credit card, The operational analytics system 10 is capable of alerting the store personal to the presence of a criminal by a person buying gas 20 times in one week across five stores using ten different credit cards. Alerts can be prioritized based on the magnitude of impact to the business.

Where current fraud detection capabilities are typically limited to a single dimension of analysis (e.g. single card brand, single convenience store brand, etc.) The operational analytics system 10 is capable of analyzing data across multiple dimensions (e.g. multiple card brands and multiple store brands, etc.)

It is noted that while using multiple access point devices, in particular for triangulation of position, it is possible to use any number of access point devices (including only one), and any reference to a "plurality if access point devices" can include the use of only one access point device.

It should understood that the embodiments described herein care capable of correlating against other data source (e.g. POS data, store demographics, labor scheduling, inventory, customer satisfaction surveys, etc.). In other words, the parameters and metrics described herein can be determined and refined or adjusted using any additional information such that the system is capable of defining real-time thresholds for alerting or performing mitigation operations.

The embodiments described herein can also benefit from the tracking and storing of the number and frequency of visits to the premises PR or other premises, the location and travel paths within or on the premises and general habits of the user of the wireless device WD. Such tracking can improve fraud prevention and overall improvement of store experience. That is, the controller 22 can "learn" the general habits of each individual wireless device WD user to further refine the parameters described herein.

The embodiments described herein have an overall improved community effect. That is community and business value is increased since the customers can leverage their data as a collective community to detect fraud and to improve overall store experience.

As can be understood, the embodiments discussed herein disclose a systematic method for assessing store performance and customer behavior across a variety of dimensions. The simplicity of the approach enables real-time analysis and dramatically reduces cost. Systemwide analysis provides insightful, effective, and actionable insights. Individual customers benefit from real-time, system wide benchmarks based on a community of relevant businesses In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operational analytics system, comprising:
an access point device configured to receive a wireless signal for at least one wireless device; and
an electronic controller configured to
receive a signal strength indicator for the at least one wireless device from the access point device,
calculate a position of the at least one wireless device based on the signal strength indicator for the at least one wireless device,
determine the position is a predetermined position designated as a checkout area, and
when the at least one wireless device is at the predetermined position,
perform a first mitigation operation related to a product at the predetermined position when a number of the product in inventory is below a first threshold number,
compare the number of the product in inventory to a second threshold number when the number of the product in inventory is not below the first threshold number,
perform a second mitigation operation related to the product at the predetermined position when the number of the product in inventory is below the second threshold number,
continue to track the at least one wireless device when a current time is not greater than a threshold time, the current time taken from an initial time when the at least one wireless device is at the predetermined position, and
perform a third mitigation operation including reducing the number of the product in inventory when the current time is greater than the threshold time.

2. The operation analytics system according to claim 1, wherein
the third mitigation operation further includes issuing an alert to notify personnel of a time the wireless device has remained within a predetermined distance of the predetermined position.

3. The operation analytics system according to claim 1, wherein
the third mitigation operation further includes automatically opening a register and assigning store personnel.

4. The operation analytics system according to claim 1, wherein
the controller is configured to determine whether the position of the wireless device is adjacent a payment machine and whether multiple transactions are occurring during a time the wireless device remains at the position adjacent the payment machine.

5. The operation analytics system according to claim 4, wherein
the third mitigation operation is further includes at least one of an alert of fraud activities and a shutdown of a payment machine.

6. The operation analytics system according to claim 1, wherein
the electronic controller is further configured to map the position of the at least one wireless device.

7. An operational analytics system, comprising:
a plurality of access point devices configured to receive a wireless signal for a wireless device and a wireless signal for a product in inventory; and
an electronic controller configured to
receive a signal strength indicator for the wireless device from the plurality of access point devices,
track a position of the wireless device based on the signal strength indicator for the wireless device,
receive a signal strength indicator for the product from the plurality of access point devices,
track the position of the product based on the signal strength indicator for the product,
calculate a distance between the tracked position of the wireless device and the tracked position of the product,
when the distance between the tracked position of the wireless device and the tracked position of the product is below a threshold distance and at a predetermined location designated as a checkout area, reduce a number of the product in inventory,
compare the number of the product in inventory to a first threshold number and a second threshold number,
when the number of the product in inventory is below the first threshold number, perform a first mitigation operation,
when the number of the product in inventory is below the second threshold number, perform a second mitigation operation,
determine a current time when the number of the product in inventory is not below the second threshold number,
continue to track the position of the wireless device when the current time is not greater than a threshold time, and
perform a third mitigation operation including opening or closing a checkout register when the current time is greater than a threshold time.

8. The operation analytics system according to claim 7, wherein
the third mitigation operation includes issuing an alert to notify personnel of a failure to meet the threshold time.

9. An operation analytics system according to claim 7, wherein
the electronic controller is further configured to calculate the position of the wireless device and the product based on the signal strength indicator for the wireless device and the product, prestored positions of the access point devices and a radio transmission parameter.

10. The operation analytics system according to claim 7, wherein
the electronic controller is further configured to calculate the position of the wireless device by calculating first distances between the wireless device and the access point devices, respectively, based on the signal strength indicator for the wireless device and a radio transmission parameter, and calculate the position of the wireless device based on the first distances and prestored positions of the access point devices.

11. The operation analytics system according to claim 7, wherein
the access point devices are installed in an indoor space.

12. The operation analytics system according to claim 11, wherein
the electronic controller is further configured to map the position of the wireless device on a floor map of the indoor space.

13. A method comprising:
receiving a wireless signal for a wireless device with an access point device;
receiving, with an electronic controller, a signal strength indicator for the wireless device from the access point device;
calculating a position of the wireless device based on the signal strength indicator for the wireless device;
determining an initial when that the position is a predetermined position designated as a checkout area; and
based on the at least one wireless device being at the predetermined position, (i) performing a first mitigation operation related to a product at the predetermined position due to a number of the product in inventory not meeting a first threshold number or a second mitigation operation related to the product at the predetermined position due to the number of the product in inventory meeting the first threshold number but not meeting a second threshold number, (ii) comparing a current time to a threshold time, the current time taken from the initial time that the position is the predetermined position, (iii) continuing to track the position of the wireless device while the current time is below the threshold time; and (iv) performing a third mitigation operation including reducing the number of the product in inventory due to the current time being greater than the threshold time.

14. The method according to claim 13, wherein
the performing the second third mitigation operation further includes issuing an alert to notify personnel of a time the wireless device has remained at the position.

15. The method according to claim 13, wherein
the performing the third mitigation operation further includes automatically opening a register and assigning store personnel.

16. The method according to claim 13, comprising
determining whether the position of the wireless device is adjacent a payment machine and whether multiple transactions are occurring during a time the wireless device remains at the position adjacent the payment machine.

17. The method according to claim 16, wherein
the third mitigation operation further includes at least one of an alert of fraud activities and a shutdown of the payment machine.

18. The operation analytics system according to claim 1, wherein
at least one of: (i) the first mitigation operation includes an alert related to low product inventory; (ii) the second mitigation operation includes alert indicating the successful depletion of the product; or (iii) the third mitigation operation further includes an alert related to a failure to meet the threshold time.

19. The operation analytics system according to claim 7, wherein
the current time is taken from an initial time when the at least one wireless device is at the predetermined location.

* * * * *